(12) United States Patent
Kiester et al.

(10) Patent No.: US 6,863,328 B2
(45) Date of Patent: Mar. 8, 2005

(54) MULTI-FUNCTIONAL CARGO BED ASSEMBLY AND ACCESSORIES THEREFOR

(75) Inventors: Lowell Kiester, Bloomfield Hills, MI (US); Douglas Street, Royal Oak, MI (US)

(73) Assignee: Projx, Inc., Madison Heights, MI (US)

( * ) Notice: Subject to any disclaimer, the term of this patent is extended or adjusted under 35 U.S.C. 154(b) by 0 days.

(21) Appl. No.: 10/353,377

(22) Filed: Jan. 29, 2003

(65) Prior Publication Data

US 2003/0168876 A1 Sep. 11, 2003

Related U.S. Application Data

(63) Continuation-in-part of application No. 10/160,790, filed on May 31, 2002, now Pat. No. 6,601,899, which is a continuation-in-part of application No. 09/921,763, filed on Aug. 3, 2001, now Pat. No. 6,517,137.

(51) Int. Cl.[7] .............................................. B62D 43/00
(52) U.S. Cl. .................. 296/37.6; 296/24.4; 410/129
(58) Field of Search ............... 296/37.6, 24.4, 296/24.43, 24.44, 26.09, 39.2, 26.08, 26.01, 26.11, 57.1, 183; 280/79.3, 638; 410/122, 129, 130, 133, 135, 138, 141, 143, 150, 118, 139; 312/319.5, 319.8, 334.47, 330.1; 224/496, 510, 542, 543, 544, 545

(56) References Cited

U.S. PATENT DOCUMENTS

| | | | |
|---|---|---|---|
| 3,352,595 A | * | 11/1967 | Bezlaj .......................... 410/139 |
| 3,464,369 A | | 9/1969 | Erickson et al. |
| 3,680,492 A | | 8/1972 | Weage |
| 3,767,059 A | | 10/1973 | Seiz |
| RE28,788 E | * | 4/1976 | Williamson, III ........... 410/118 |
| 4,585,265 A | | 4/1986 | Mader |
| 4,629,390 A | | 12/1986 | Burke |
| 4,705,317 A | | 11/1987 | Henri |
| 4,722,646 A | | 2/1988 | McIntyre |
| 4,733,899 A | | 3/1988 | Keys |
| 4,834,599 A | | 5/1989 | Gordon et al. |
| 4,880,342 A | * | 11/1989 | Pradovic ..................... 410/121 |
| 4,909,558 A | | 3/1990 | Roshinsky |
| 5,044,682 A | | 9/1991 | Wayne |
| 5,167,434 A | | 12/1992 | Bott |
| D336,062 S | | 6/1993 | Austin |
| 5,259,712 A | | 11/1993 | Wayne |
| 5,265,993 A | | 11/1993 | Wayne |
| 5,411,355 A | | 5/1995 | Gosnell et al. |
| 5,415,506 A | | 5/1995 | Payne |
| 5,423,463 A | | 6/1995 | Weeks |
| 5,427,486 A | | 6/1995 | Green |
| 5,443,160 A | | 8/1995 | Tortorella et al. |
| 5,443,586 A | | 8/1995 | Cargill |
| 5,456,511 A | | 10/1995 | Webber |
| 5,456,514 A | | 10/1995 | Justice |
| 5,564,767 A | | 10/1996 | Strepek |
| 5,586,850 A | | 12/1996 | Johnson |
| 5,603,439 A | | 2/1997 | Pineda |
| 5,628,442 A | | 5/1997 | Wayne |
| 5,669,654 A | | 9/1997 | Eilers et al. |

(List continued on next page.)

FOREIGN PATENT DOCUMENTS

WO          WO 97/17066          11/1991

*Primary Examiner*—Lori L. Coletta
(74) *Attorney, Agent, or Firm*—Harness, Dickey & Pierce, PLC

(57) ABSTRACT

A multi-functional cargo area assembly for a cargo bed of a vehicle includes a first and a second side wall disposed in a transversely spaced relationship, and an integrally formed guide track in the first and second side walls. The cargo area assembly also includes extendible side wall portions. The cargo area assembly further includes a movable divider panel supported with the guide track by a support rod, and extending transversely between the first and second side walls, wherein the divider panel includes a positioning mechanism for fixedly locating the divider panel.

13 Claims, 21 Drawing Sheets

U.S. PATENT DOCUMENTS

| | | |
|---|---|---|
| 5,720,507 A | 2/1998 | Emery |
| 5,746,025 A | 5/1998 | Shimura |
| 5,816,637 A | 10/1998 | Adams et al. |
| 5,845,953 A | 12/1998 | Rusnock |
| 5,924,753 A | 7/1999 | DiBassie |
| 5,927,783 A | 7/1999 | Baka |
| 5,938,262 A | 8/1999 | Mills |
| 6,015,178 A | 1/2000 | Haack |
| 6,050,628 A | 4/2000 | Allison et al. |
| 6,176,406 B1 | 1/2001 | Laumann |
| 6,186,575 B1 | 2/2001 | Fisher et al. |
| 6,237,211 B1 | 5/2001 | Clare et al. |
| 6,367,858 B1 | 4/2002 | Bradford |
| 6,514,022 B2 * | 2/2003 | Truckor et al. ............. 410/138 |

* cited by examiner

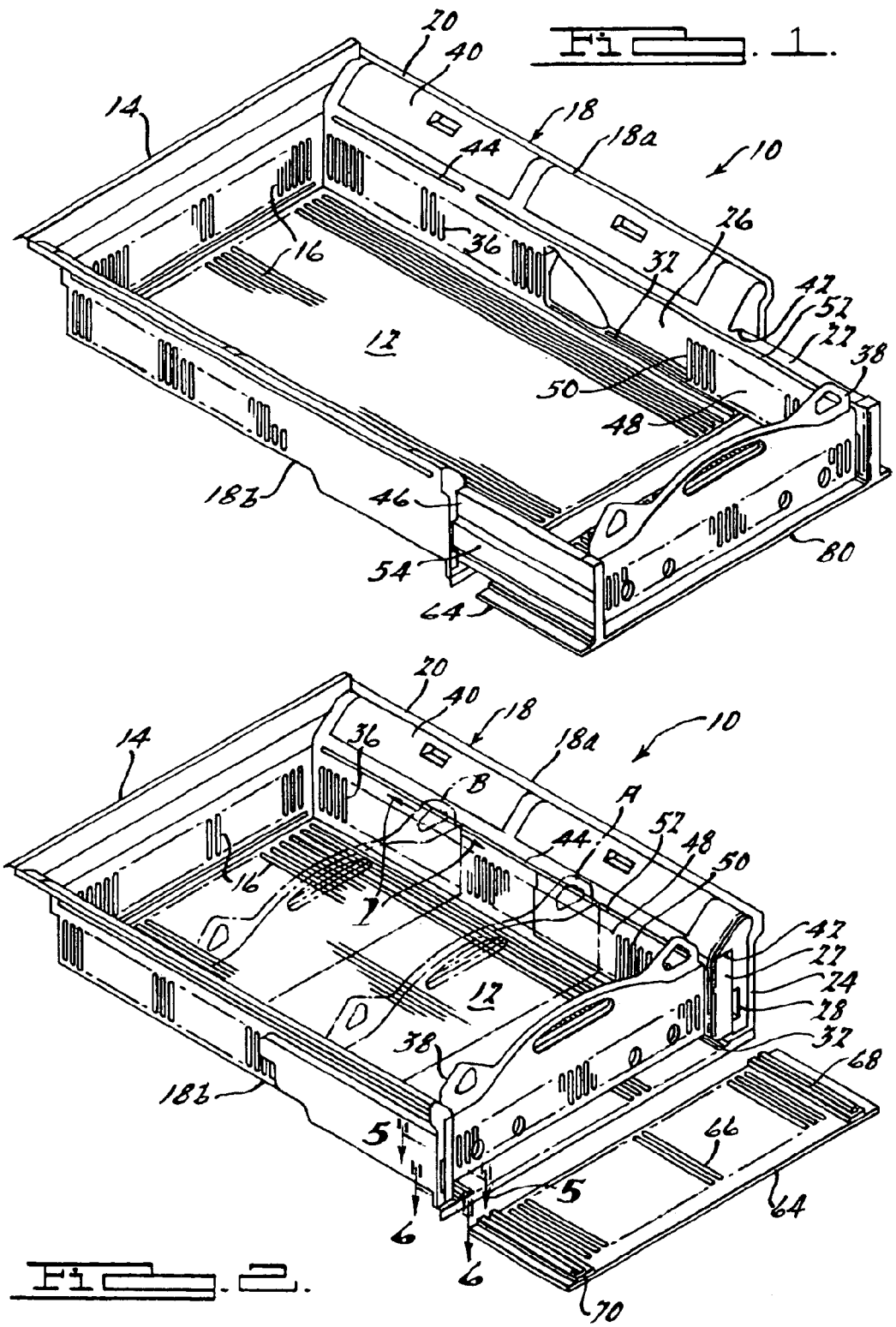

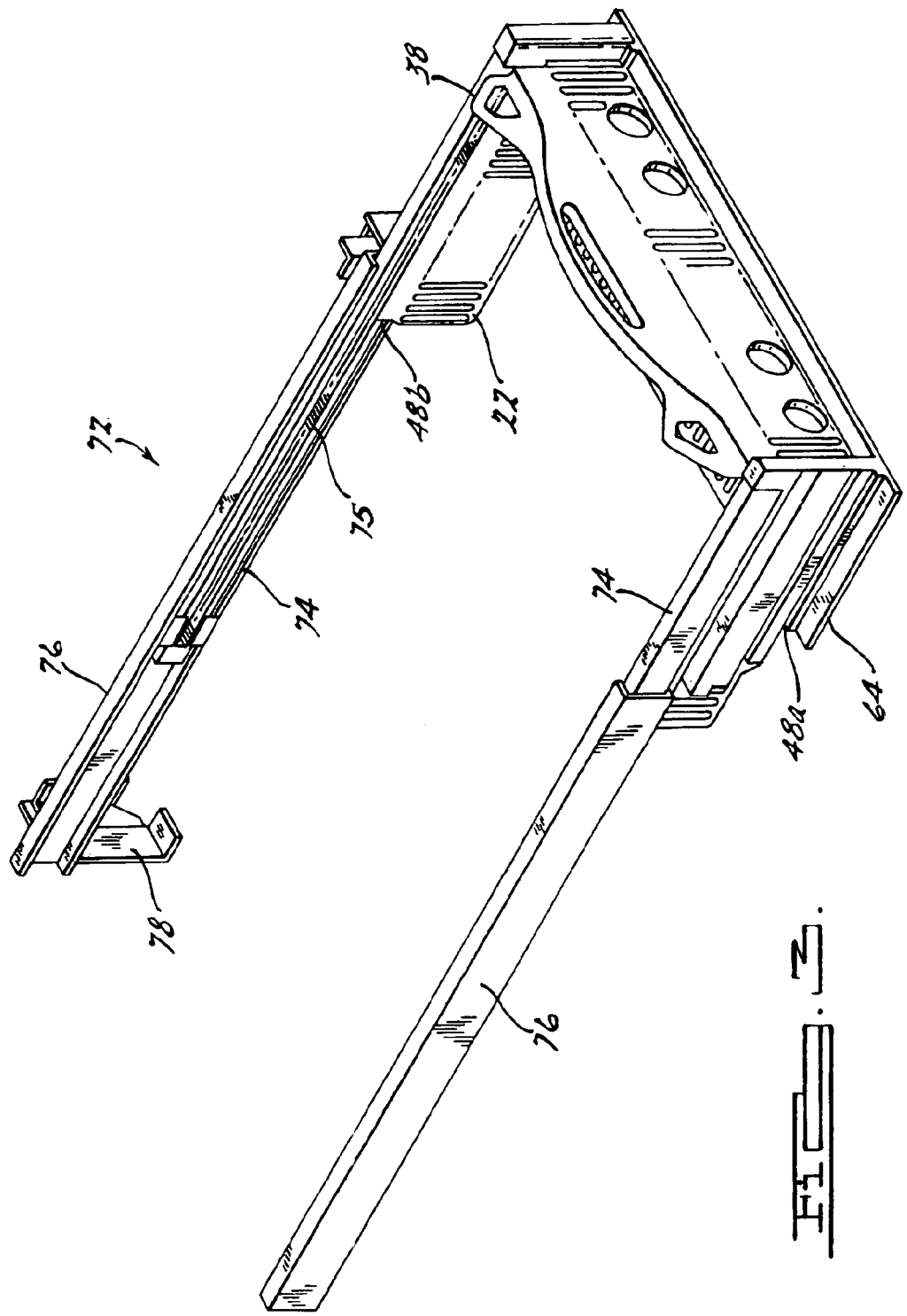

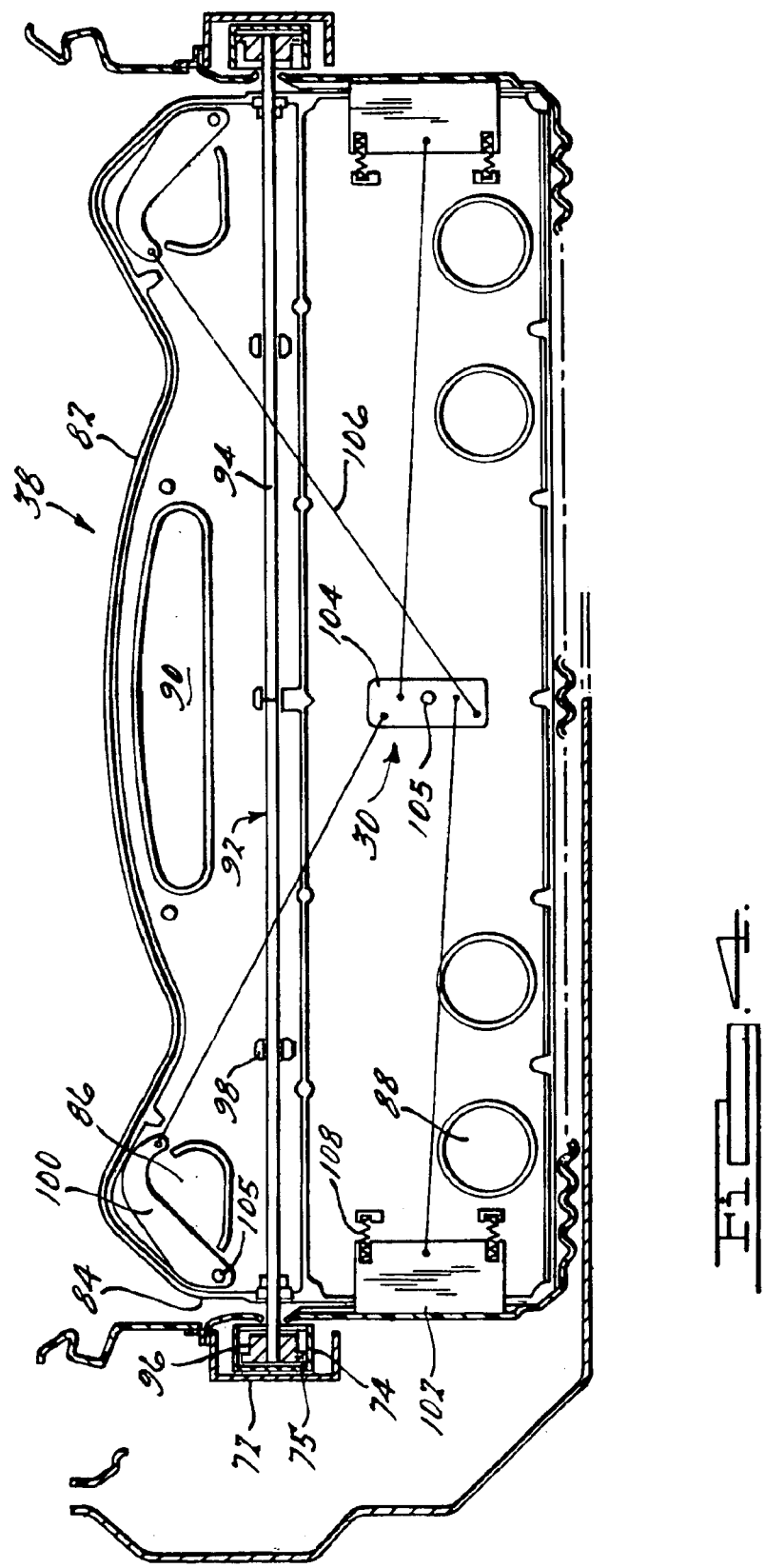

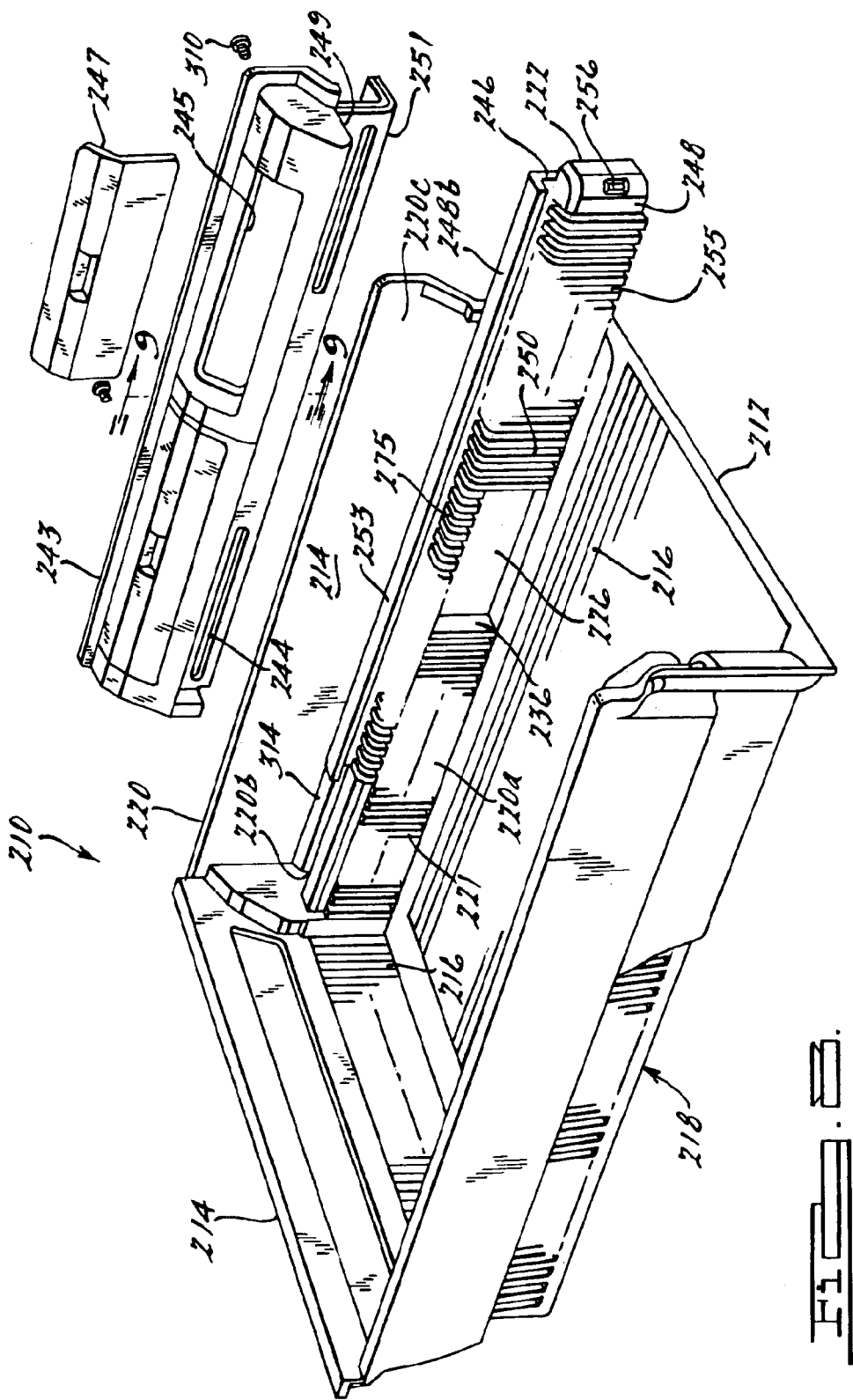

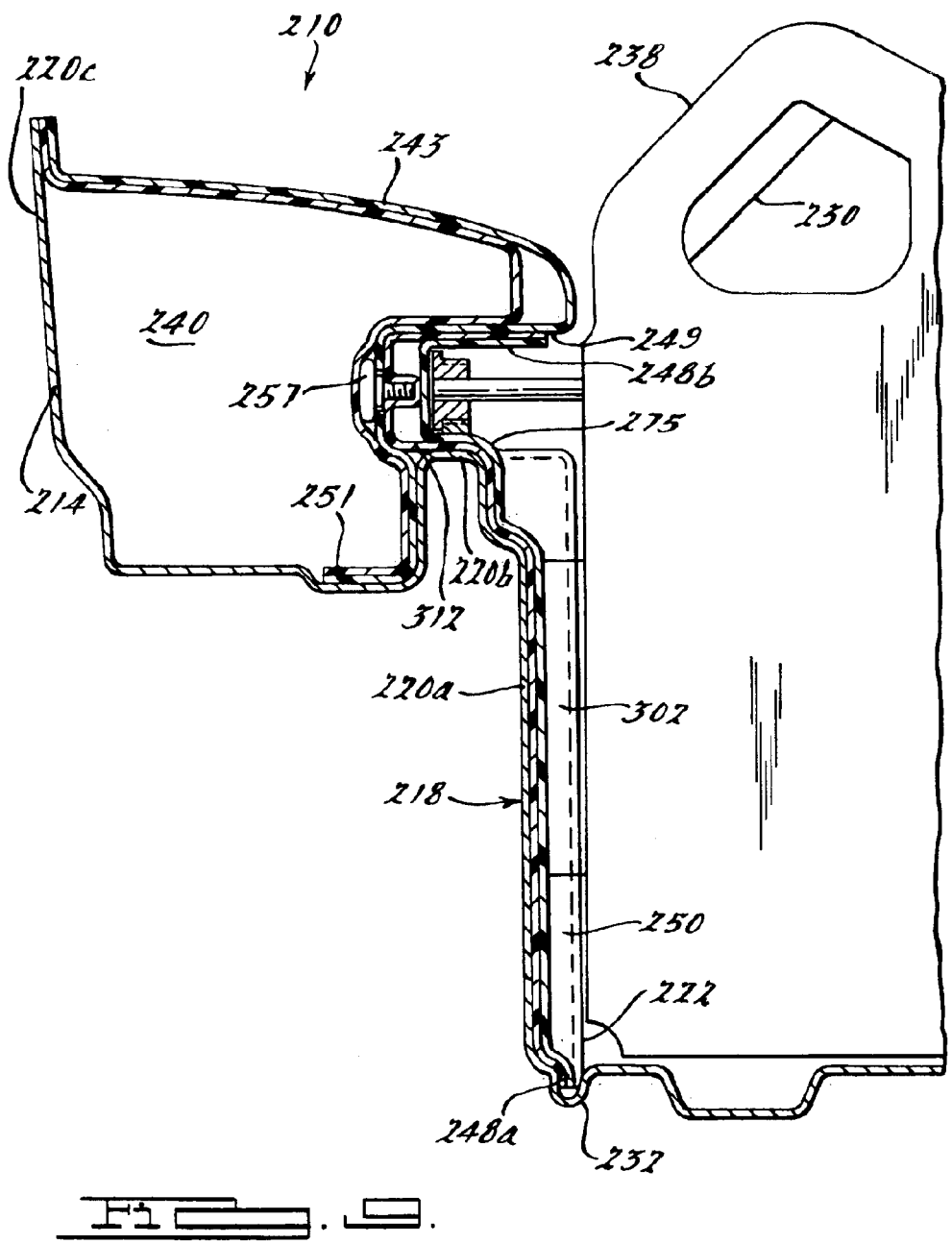

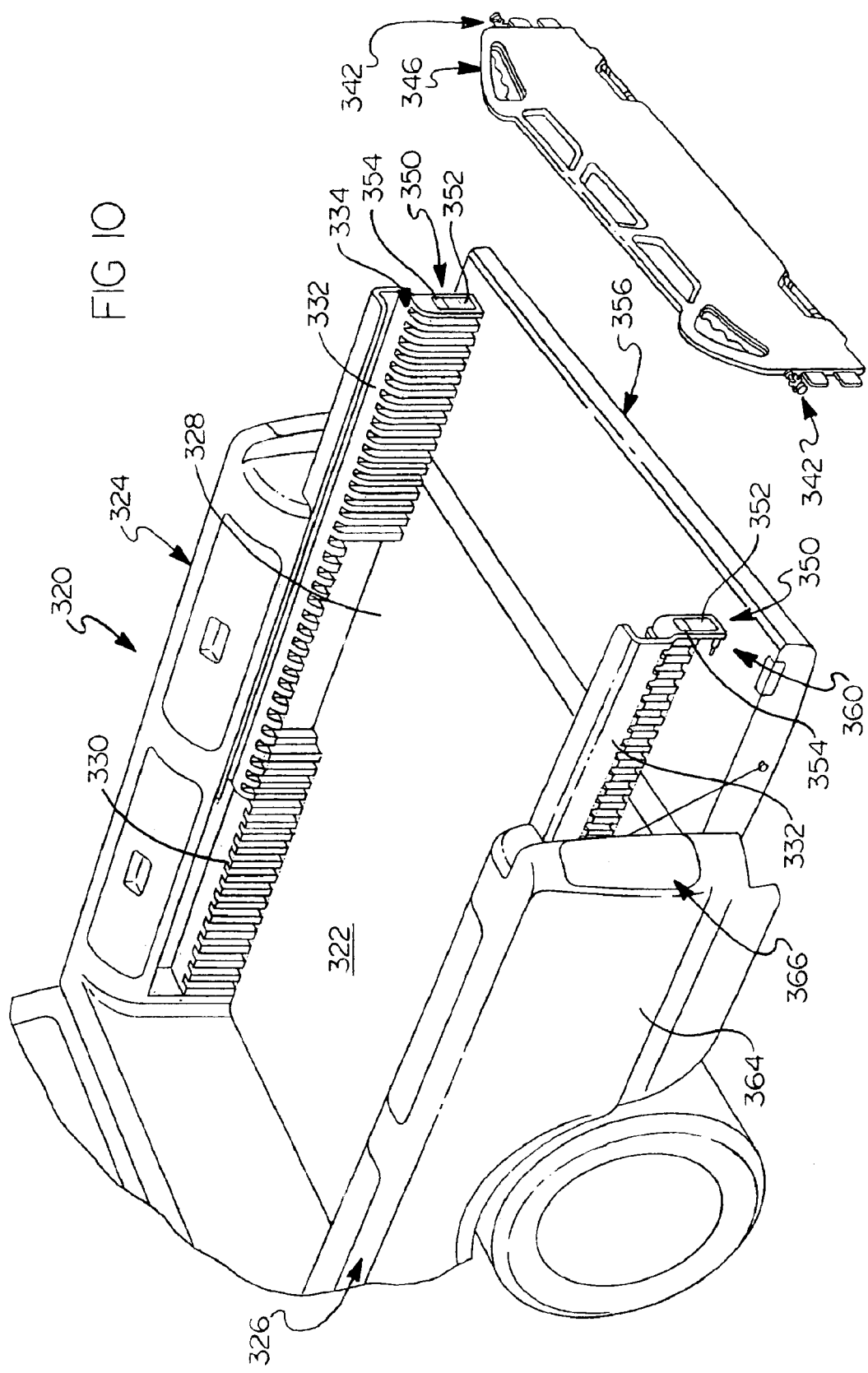

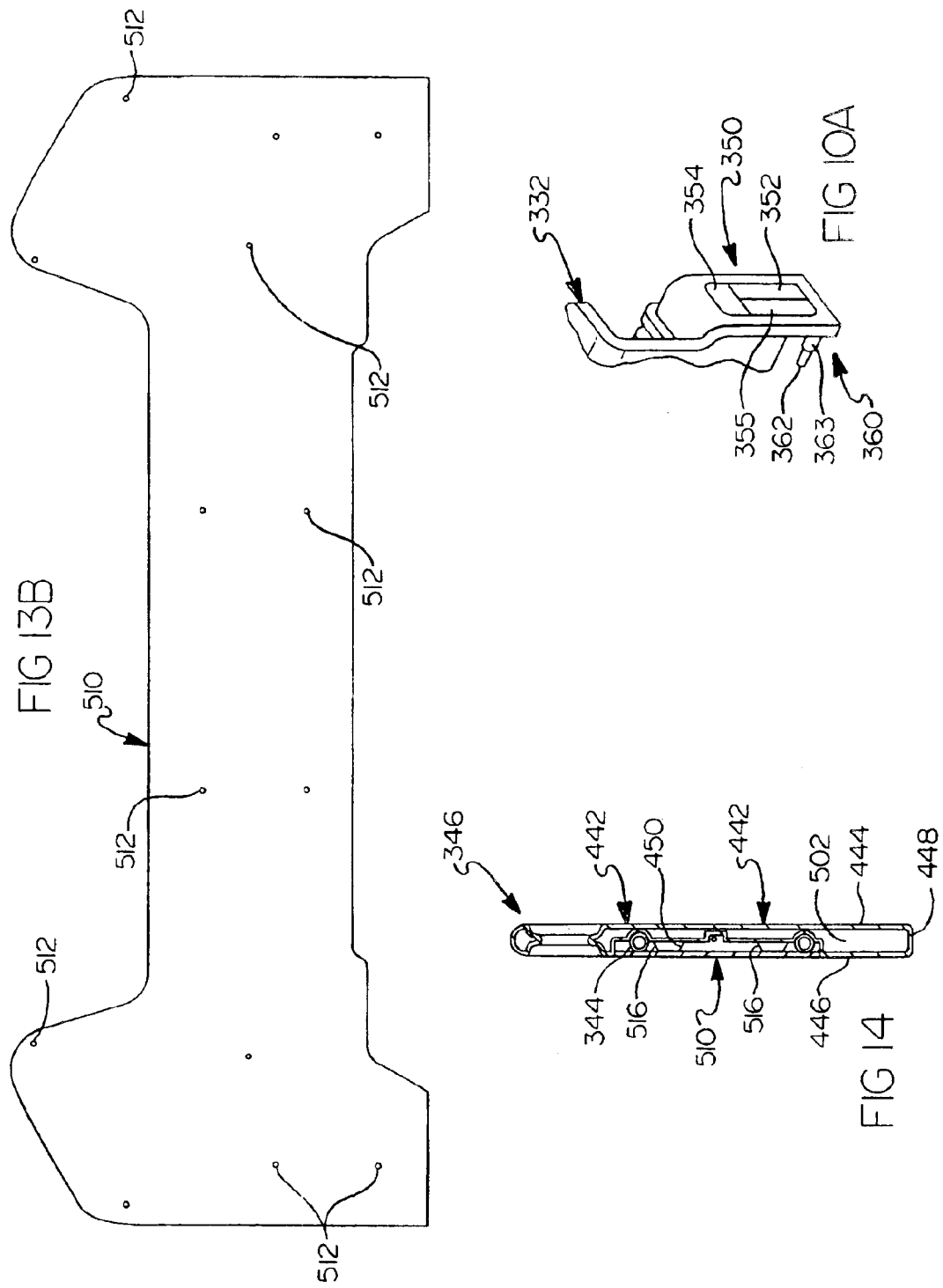

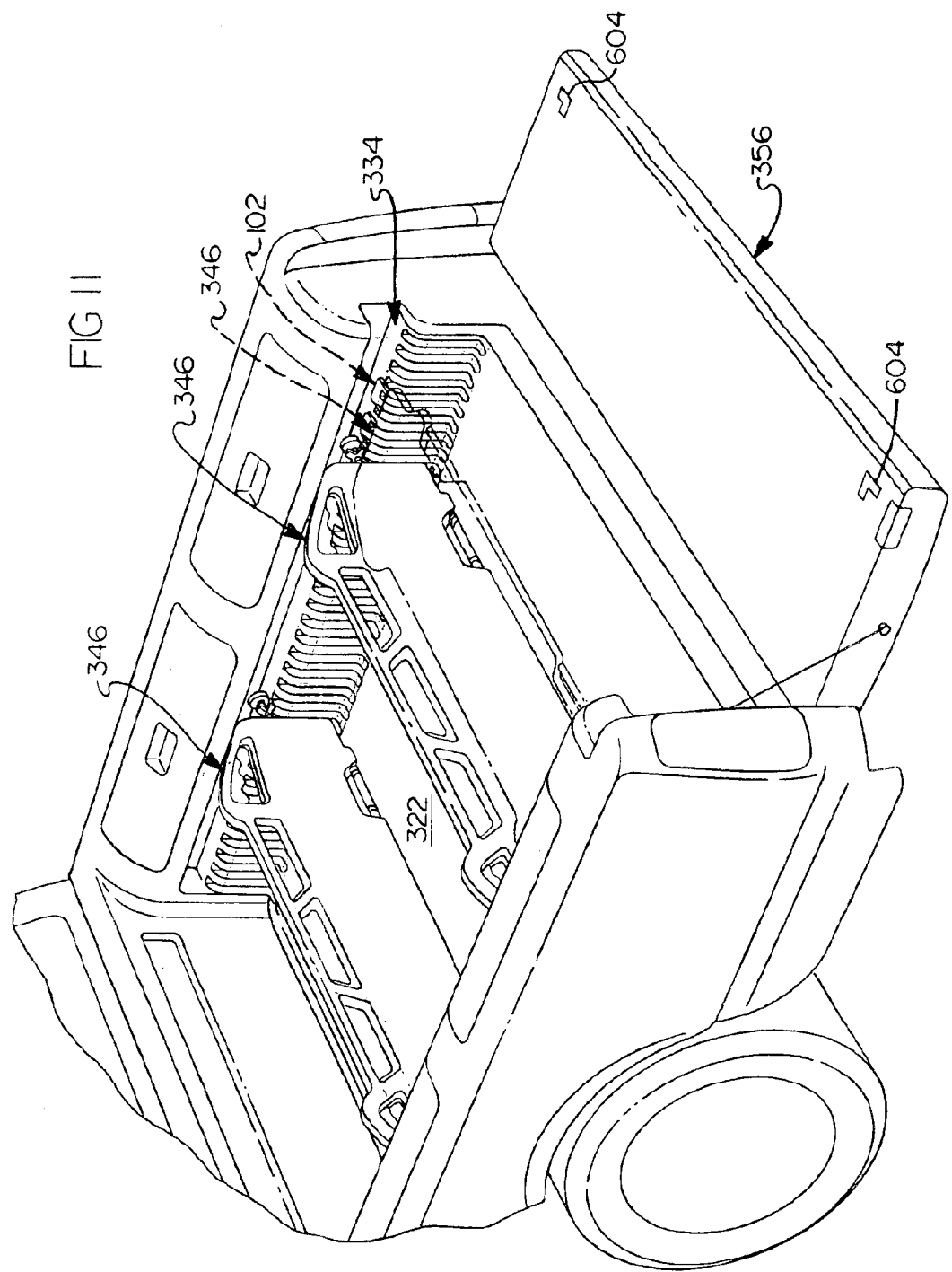

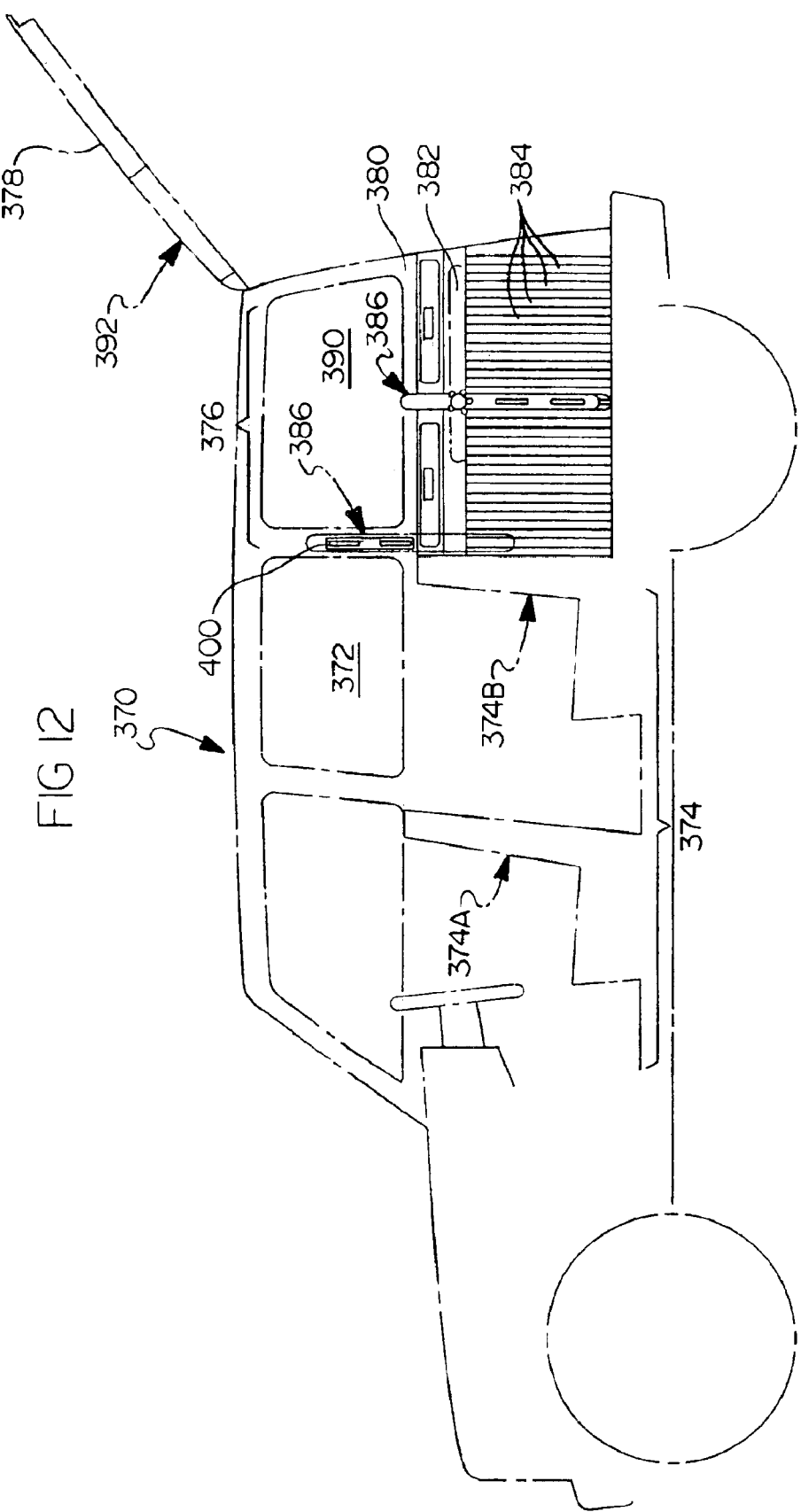

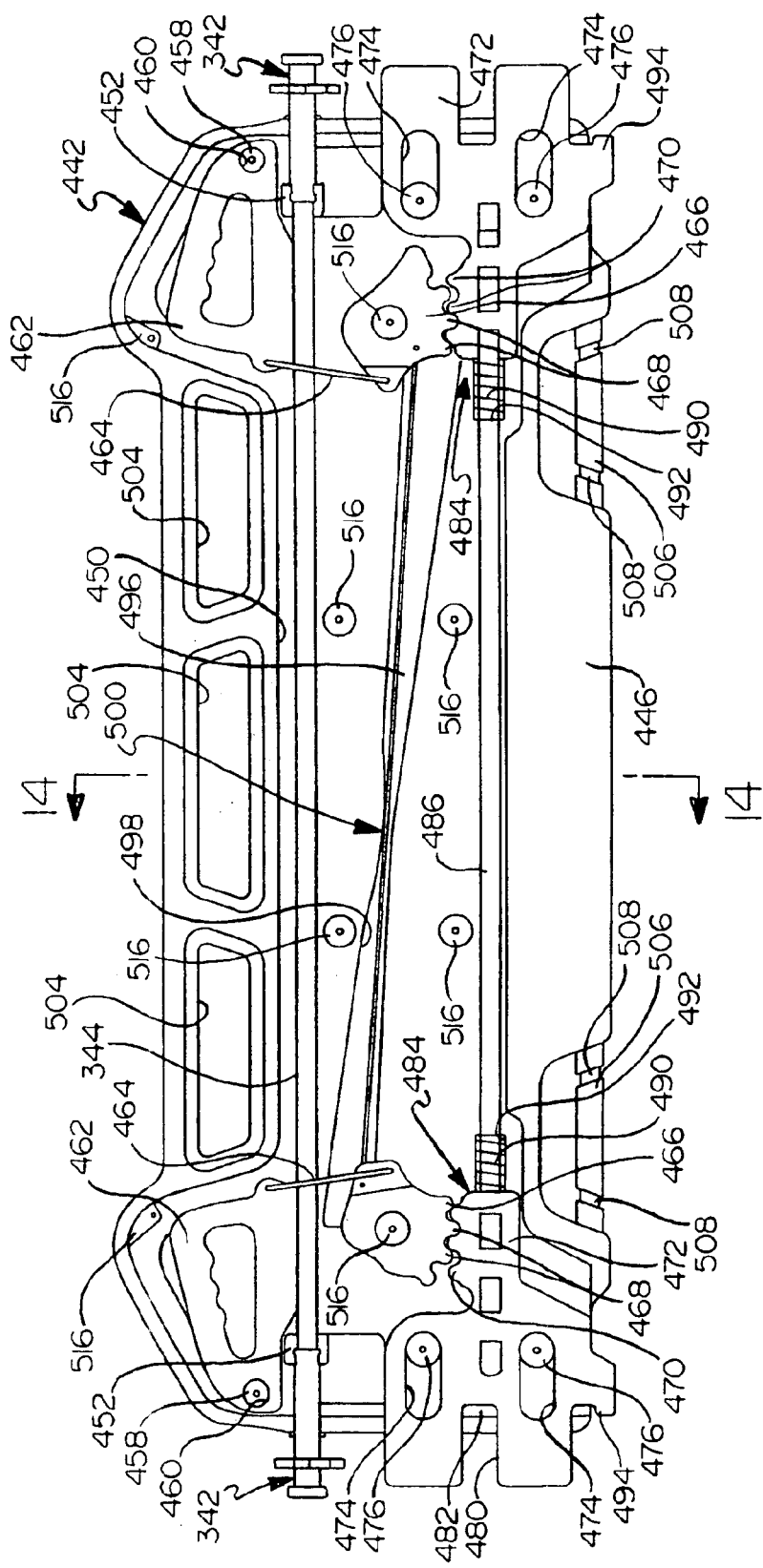

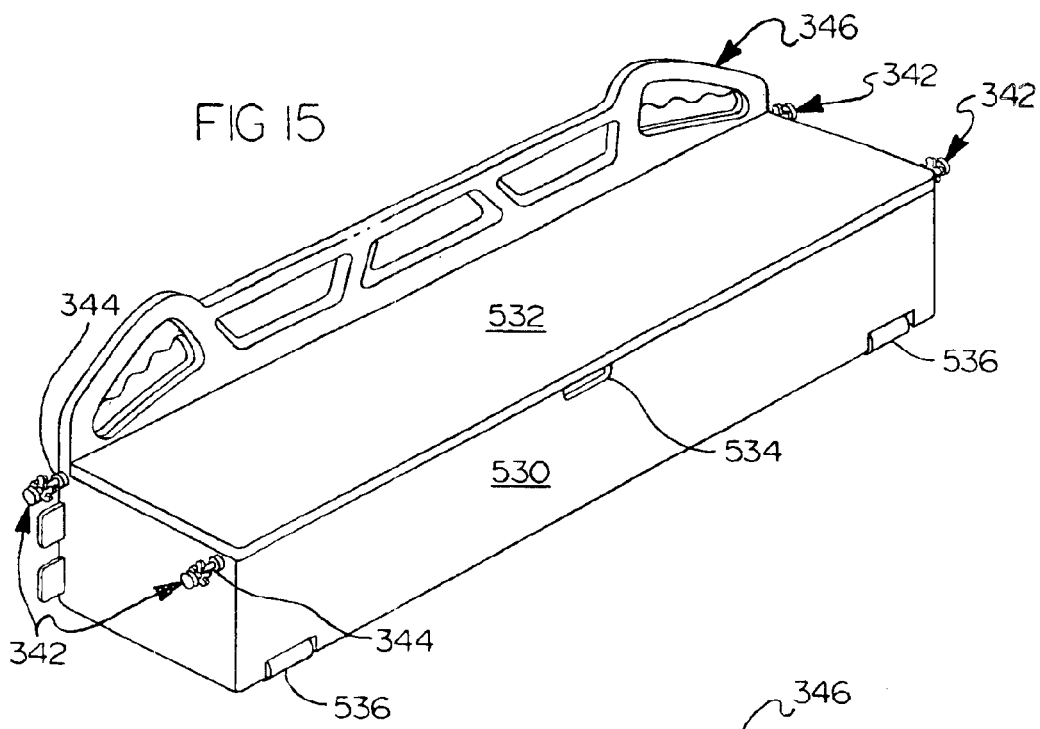
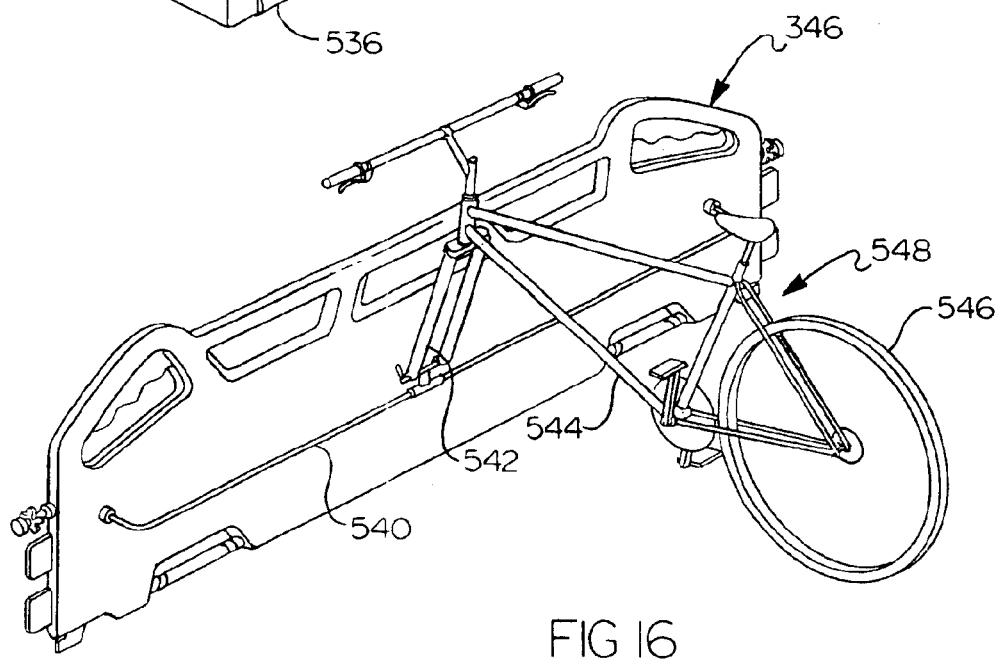

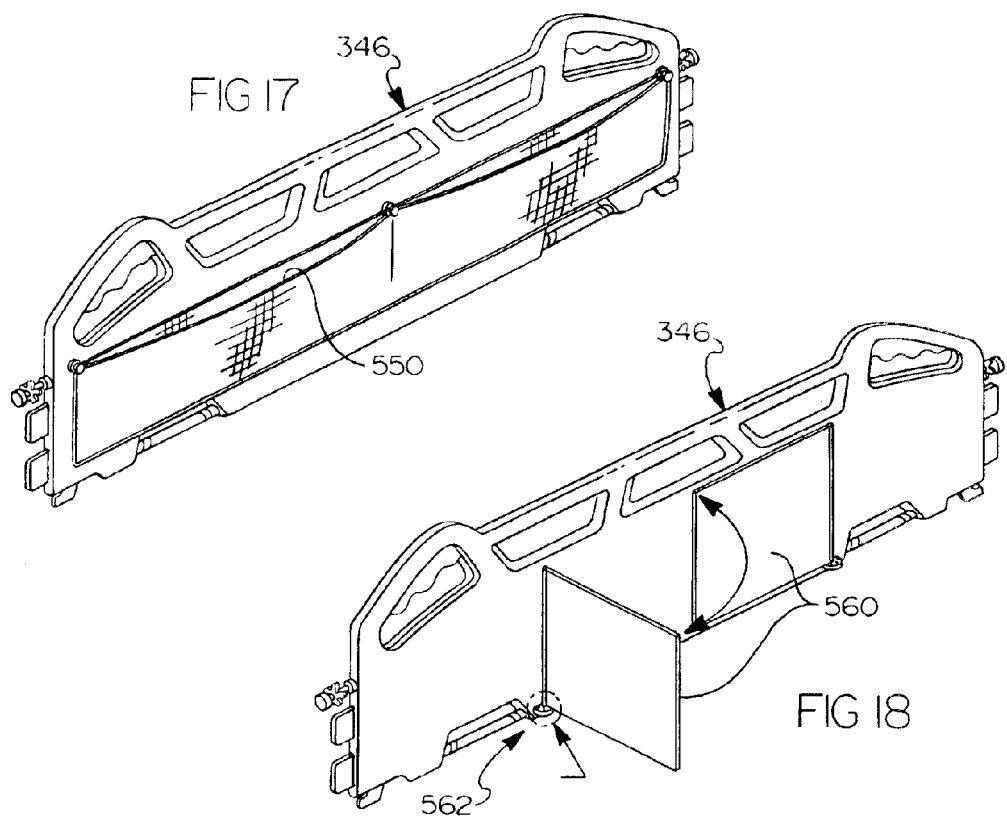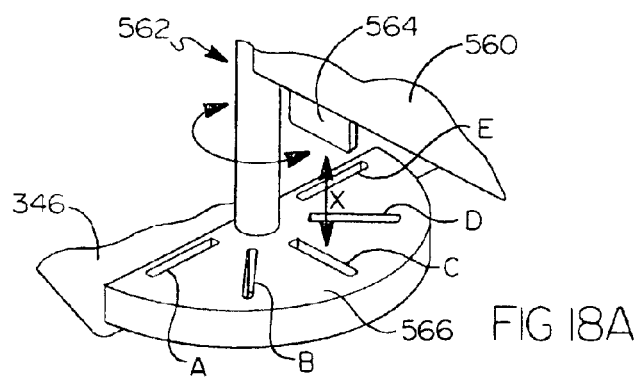

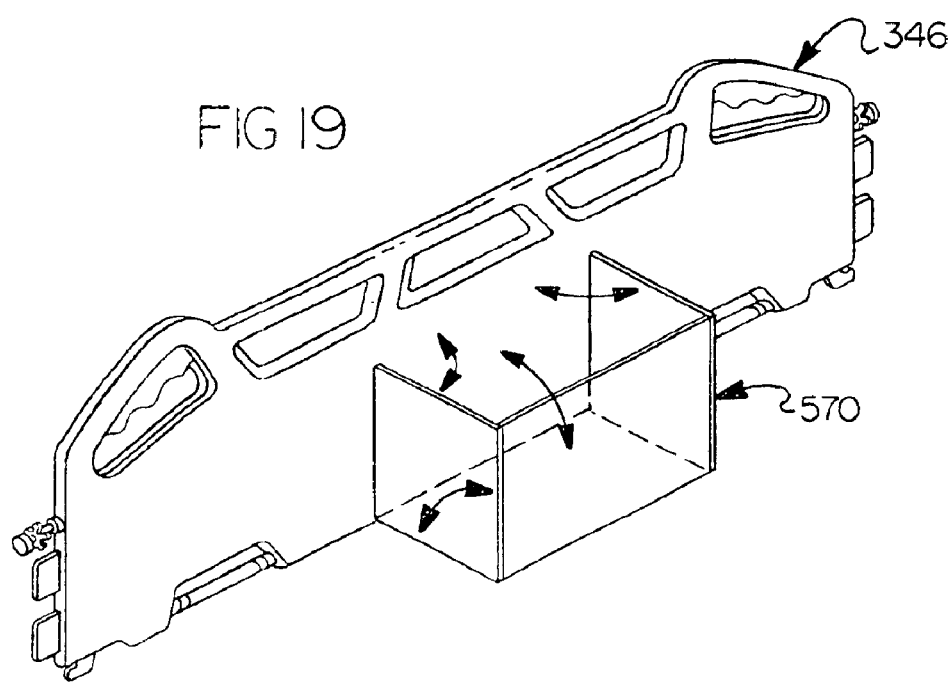
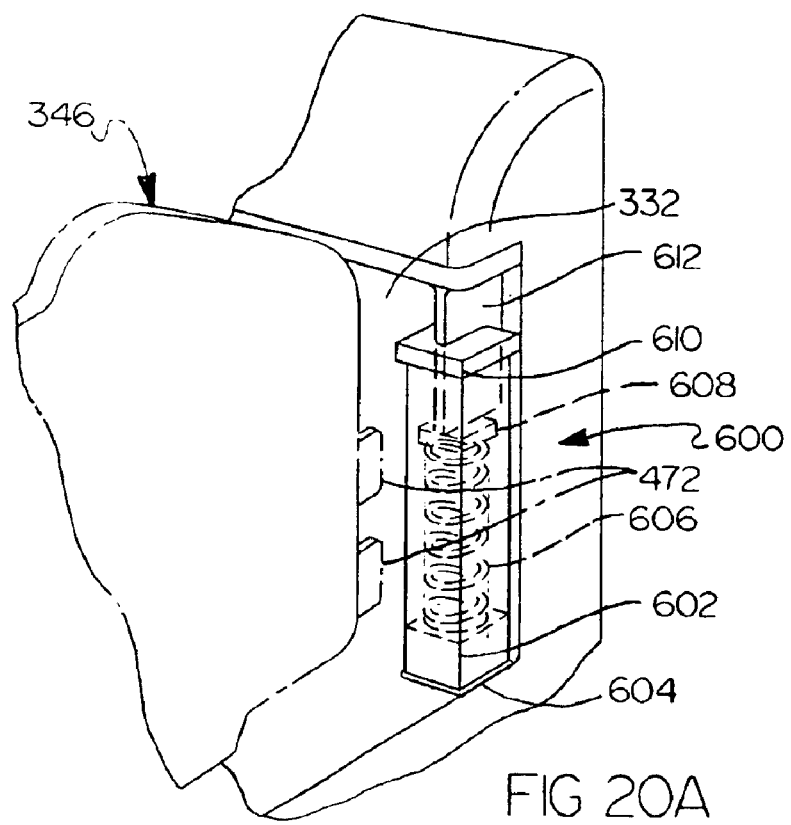

MULTI-FUNCTIONAL CARGO BED ASSEMBLY AND ACCESSORIES THEREFOR

CROSS-REFERENCE TO RELATED APPLICATIONS

This application is a continuation-in-part of U.S. Pat. application Ser. No. 10/160,790 filed on May 31, 2002, now U.S. Pat. No. 6,601,899 which is a continuation-in-part of U.S. patent application Ser. No. 09/921,763 filed Aug. 3, 2001 now U.S. Pat. No. 6,517,137. The disclosures of the above applications are incorporated herein by reference.

FIELD OF THE INVENTION

The present invention relates generally to a cargo bed liner for a vehicle, such as a pickup truck or a sport utility. More specifically, the invention relates to a multi-functional cargo bed liner assembly for the cargo bed portion of a vehicle, which functions to extend the length of the cargo bed and includes an infinitely positionable divider panel.

BACKGROUND OF THE INVENTION

Utility vehicles, such as pickup trucks and cargo vans are characterized by a load carrying portion, referred to as a cargo bed, defined by a generally planar floor. The dimensions of the cargo bed vary in length from several feet to more than eight feet. These types of vehicles are multifunctional, since they satisfy both transportation and load carrying capacity needs.

Various devices are available to further increase the versatility of the utility vehicle, and in particular the cargo bed portion. One example of such a device is a cargo bed cover for enclosing the cargo bed of a pickup truck. Another example is a removable cargo bed liner, which is configured with the shape of the cargo bed, to protect the surface finish of the cargo bed. Still another example is a cargo bed divider, for subdividing the cargo bed of the pickup truck to accommodate diverse, or various sized, loads. The prior art has implemented a number of different approaches towards providing cargo bed dividers for pickup trucks. Some prior art dividers are shown in U.S. Pat. Nos. 5,411,355; 4,722,646; 5,603,439; 5,456,514; 5,423,463; 5,415,506; 3,767,059; 5,044,682; 4,733,899; 5,265,993; 5,586,850; 5,628,442; 5,845,953; 4,834,599; 5,259,712 and 5,927,783. At the same time, it is also advantageous to expand the volume of the cargo bed of a pickup truck to accommodate an oversized load, such as a 4×8' sheet of plywood.

While various of the prior art cargo bed liners and divider systems referenced herein are reconfigurable, none of these systems allow for the expansion of the interior volume of a pickup truck's cargo bed. Thus, there is a need in the art for a multi-functional cargo bed liner assembly that is expandable and includes a divider panel that is infinitely positionable.

SUMMARY OF THE INVENTION

Accordingly, the present invention is a multi-functional cargo area assembly for a cargo bed of a vehicle. The cargo area assembly includes a first and a second side wall disposed in a transversely spaced relationship, and an integral guide track formed in the first and second side walls. The cargo area assembly also includes an end wall extending between the first and second side wall at a first end, and a floor extending between the first and second side walls. The cargo area assembly further includes a movable divider panel supported within the track by a support means, and extending transversely between the first and second side walls, wherein the divider panel includes a positioning mechanism for fixedly locating the divider panel.

One advantage of the present invention is that a multi-functional cargo area for a vehicle is provided that includes a divider panel which can be positionally fixed at infinite locations within the cargo bed, so as to subdivide the cargo bed into a plurality of separate areas. Another advantage of the present invention is that the divider panel can articulate and be fixed in a horizontal position, to provide a work surface. Still another advantage of the present invention is that the divider panel can be stowed near the front of the vehicle when not in use. A further advantage of the present invention is that a side wall and the divider panel can be extended out onto a lowered tailgate of the vehicle, to increase the length of the cargo bed. Still a further advantage of the present invention is that the side wall includes an integrated track for repositioning the divider panel. A further advantage of the present invention is that multiple accessories can be utilized in combination with the multi-functional cargo area assembly to further increase the functionality thereof.

Other advantages and features of the present invention will be readily appreciated as the same becomes better understood after reading the subsequent description when taken in conjunction with the accompanying drawings.

BRIEF DESCRIPTION OF THE DRAWINGS

FIG. 1 is a perspective view of a multi-functional cargo bed liner assembly with a side wall fully extended, according to the present invention;

FIG. 2 is a perspective view of the cargo bed liner assembly of FIG. 1, showing the side wall retracted and the divider system in a number of alternative positions, according to the present invention;

FIG. 3 is a perspective view of a frame for supporting the cargo bed liner assembly of FIG. 1, according to the present invention;

FIG. 4 is an elevational cutaway view of the cargo bed divider panel, according to the present invention;

FIG. 8 is a perspective view of another embodiment of a multifunctional cargo bed liner assembly with a side wall having an integral track, according to the present invention;

FIG. 9 is a sectional view taken along lines 9—9 of FIG. 8 of the divider panel positioned within integral track, according to the present invention;

FIG. 10 is a perspective view of a multi-functional cargo area for a vehicle having extendable side walls and including tail lights provided at the end of the extendable side walls;

FIG. 10A is a detailed perspective view of a switch device for activating and deactivating the tail lights of the extendable side walls shown in FIG. 10;

FIG. 11 is a perspective view of a multi-functional cargo area of a vehicle having two divider panels which are movable from a vertical position to a horizontal position to provide two tier loading for the vehicle cargo area;

FIG. 12 is a perspective view of a utility vehicle including a cargo area equipped with guide tracks according to the principles of the present invention with the divider panel being movable from a first upright vertical position to a second horizontal position for providing a sunshade and a third upside down vertical position for providing a barrier between the vehicle passenger compartment and the cargo area of the vehicle;

FIG. 13A is a plan view of the main panel of the divider panel assembly with the cover panel removed to show the interior components thereof according to the principles of the present invention;

FIG. 13B is a plan view of the cover panel of the divider panel assembly according to the principles of the present invention;

FIG. 14 is a cross-sectional view of the divider panel taken along line 14—14 in FIG. 13A;

FIG. 15 is a perspective view of a divider panel having a toolbox mounted thereon for movement with the divider panel;

FIG. 16 is a perspective view of a divider panel having a bike rack mounted thereon;

FIG. 17 is a perspective view of a divider panel having a cargo net mounted thereon;

FIG. 18 is a perspective view of a divider panel having pivoting separator panels mounted thereon;

FIG. 18A is a detailed perspective view of the angular adjustment device for the pivoting divider panels of FIG. 18;

FIG. 19 is a perspective view of a divider panel having a foldable box mounted thereon;

FIG. 20A is a perspective view of a side wall locking mechanism according to the principles of the present invention;

DETAILED DESCRIPTION OF THE INVENTION

Figure 5:
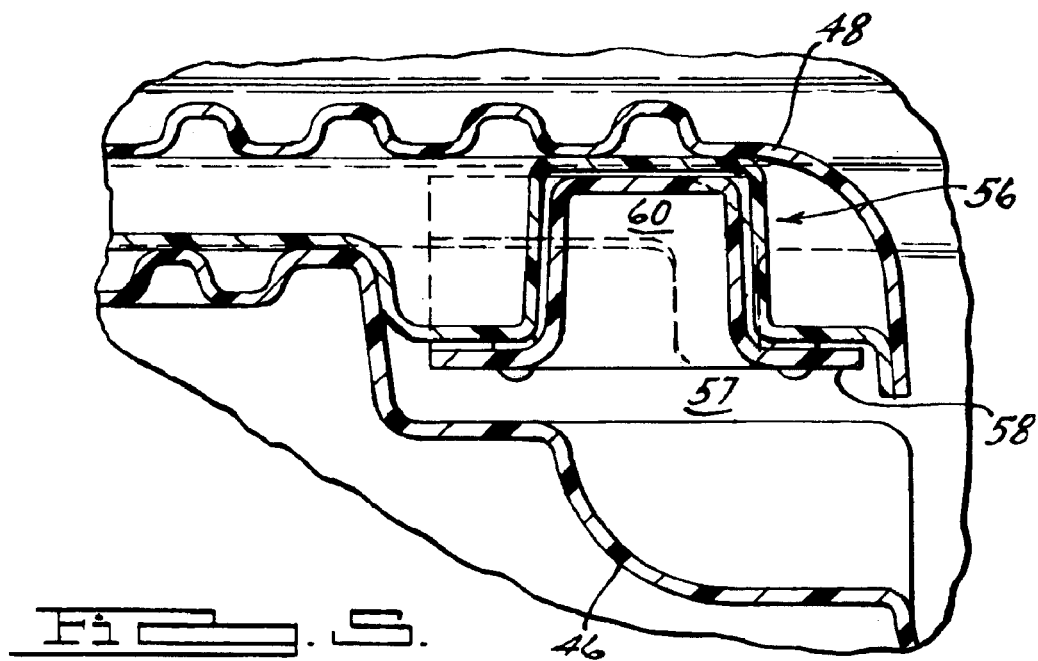
FIG. 5 is an elevational cutaway view taken along lines 5—5 of FIG. 2 of the locking mechanism, according to the present invention.

The multi-functional cargo bed assembly 10 of the present invention is operable to subdivide the cargo bed of a utility vehicle, such as a pickup truck, into a number of separate areas. It is further operable to extend out onto the lowered gate of a pickup truck to expand the volume of the cargo bed. Most preferably, the extension sections and divider panel fully enclose the sides of the cargo bed when the panel is extended out onto the lowered tailgate.

Referring to FIGS. 1–7, a multi-functional cargo bed liner assembly 10 for the cargo bed portion of a vehicle (not shown), which in this example is a pickup truck, is illustrated. The cargo bed liner assembly 10 has a general box-like shape. The cargo bed liner assembly 10 includes a generally planar floor portion 12, forming the floor of the cargo bed liner 10. The cargo bed liner assembly 10 also includes an end wall 14 extending from an end of the floor 12, adjacent the cab of the vehicle. Preferably, both the floor 12 and end wall 14 include a plurality of integrally formed ribs 16. The ribs 16 are spaced a predetermined distance apart, and extend longitudinally. Advantageously, the ribs 16 provide structural support to the floor 12 and end wall 14, respectively.

The cargo bed liner assembly 10 further includes a side wall 18 extending upwardly from a side edge of the floor 12. In this example, the cargo bed liner assembly includes a first side wall 18a disposed in a transversely spaced relationship with a second side wall 18b. The side wall 18 includes a fixed side wall 20 with a side extension wall 22 slidably attached to the fixed side wall 20. It should be appreciated that the fixed side wall 20 is generally planar, and a first side edge of the fixed side wall 20 is adjacent to the end wall 14, and a second side edge of the fixed side wall is unattached, as shown at 24. The fixed side wall 20 and side extension wall 22 may include an integrally formed feature as shown at 26 such as a depression or boss or the like. In particular, the integrally formed feature 26 enables the cargo bed liner assembly 10 to conform with the shape of the cargo bed portion of the vehicle.

Figure 6:
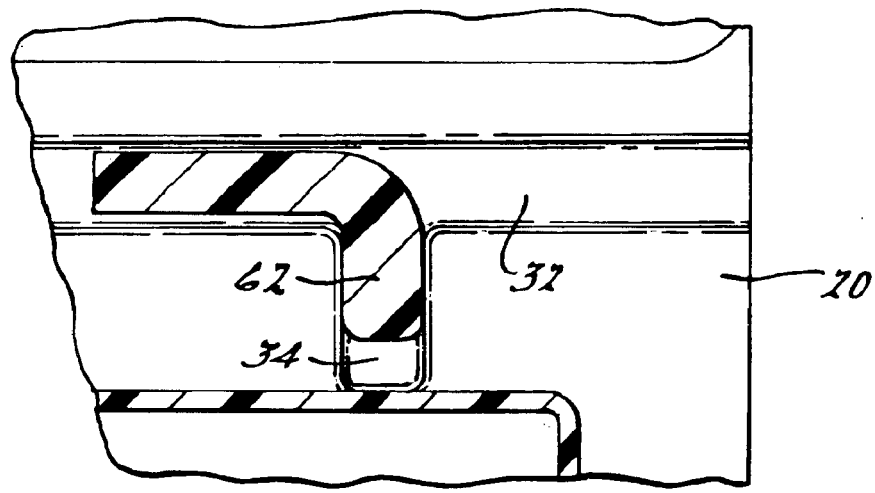
FIG. 6 is an elevational view taken along lines 6—6 of FIG. 2 of the locking mechanism locking tab within the locking groove, according to the present invention.
Figure 7:
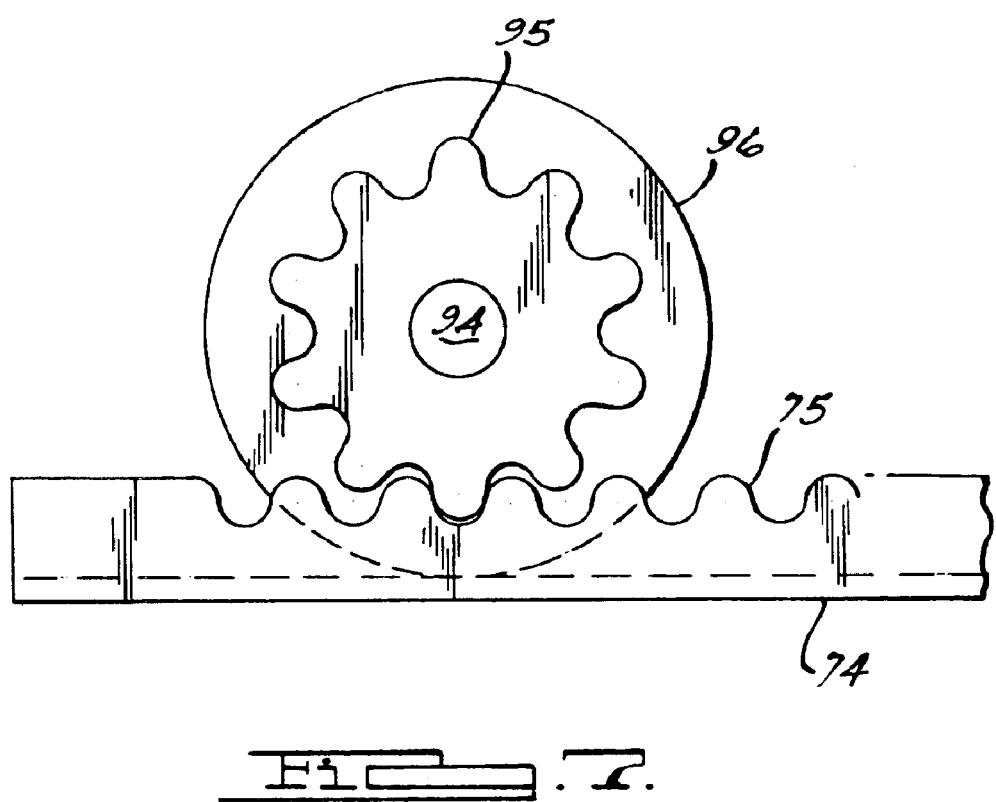
FIG. 7 is an elevational cutaway view taken along line 7—7 of FIG. 2 of the wheel and gear track, according to the present invention.

In this example, the unattached edge 24 of the fixed side wall 20 includes an integrally formed depression having a rectangular shape, as shown at 28, to provide access to a positioning mechanism 30, for positioning the side extension wall 22 with respect to the fixed side wall 20 in a manner to be described. A lower portion of the fixed side wall 20 includes an integrally formed groove extending longitudinally, to provide a lower track 32 for slidably positioning the side extension wall 22. Preferably, the length of the lower track 32 corresponds to the distance of travel required for the side extension wall 22. As shown in FIG. 6, the lower track 32 also includes a portion extending radially a predetermined distance from the lower track 32 to form a locking groove 34, for locking the side extension wall 22 in a desired position, in a manner to be described.

A lower portion of the fixed side wall 20 includes a plurality of integrally formed, vertically extending indexing grooves 36 spaced a predetermined distance apart, extending longitudinally there along the fixed side wall 20 a predetermined length, for indexing the position of a divider panel 38 of the cargo bed liner assembly 10, in a manner to be described. In this example, the lower portion of the fixed side wall 20 includes a plurality of indexing grooves 36, and a recess 26 that conforms with the shape of the wheel well portion of the cargo bed. Also in this example, an upper portion of the fixed side wall 20 includes an integrally formed storage box 40 having a cover, for storing items within. In addition, a lower edge of the upper portion of the fixed side wall 20 forms a lip, to provide an upper track 42 for guiding the movement of the side extension wall 22. The fixed side wall 20 also includes a slot 44 extending longitudinally between the upper portion and lower portion of the fixed side wall 20, to provide access to a track for the divider panel 38.

Advantageously, the side extension wall 22 increases the overall length of the cargo bed of the vehicle. It is contemplated that the side extension wall 22 may be a single panel, or an assembly. In this example, the side extension wall 22 is an assembly and includes an inner panel 46 joined to an outer panel, 48 to form a unitary wall, having a box-like shape. The outer panel 48 is a generally planar member. The outer panel 48 includes a lower flange 48a extending from lower portion of the outer panel 48 to form a lower guide for the side extension wall in the lower track 32 in the fixed side wall 20. The outer panel 48 also includes an upper flange 48b extending from an upper edge of the outer panel 48, to form an upper guide for the side extension wall 22 with respect to the upper track 42 formed in the fixed side wall 22.

A lower portion of the outer panel 48 further includes a plurality of vertically extending indexing grooves 50 spaced a predetermined distance apart, similar to the grooves 36 in the fixed side wall 20, for positioning the divider panel 38. The outer panel 48 further includes a longitudinally extending slot shown at 52 positioned above the indexing grooves 50 in the outer panel 48. It should be appreciated that the slot 44 in the fixed side wall 20 and slot 52 in the outer panel 48 form a single slot, to allow unencumbered travel of the divider panel 38. The outer panel 48 may include a cutaway portion (not shown) at en end of the slot 52, for removing the divider panel 38 from the cargo bed liner assembly 10.

The inner panel 46 is also a generally planar member. In this example, the inner panel 46 includes a longitudinally extending channel shown at 54 having a box-like shape. Advantageously, the inner panel 46 and outer panel 48 can be formed and joined as one using a conventional technique, such as blow molding.

Referring to FIGS. 5–6, the side extension panel further includes a locking mechanism 56, for retaining the side extension wall 22 in a fixed position relative to the fixed side wall 20. The locking mechanism 56 is slidably disposed between the inner panel 46 and outer panel 48 of the side extension wall 22. Preferably, an outer edge of the outer panel includes a recess, shown at 57, to provide the operator access to the locking mechanism 56. In this example, the locking mechanism includes a handle 58 for actuating the locking mechanism 56 to position the side extension wall 22 with respect to the fixed side wall 20. The handle 58 includes a generally planar face, with a rectangular recess shown at 60, for receiving the fingers of the operator in locking and unlocking the side extension panel. A lower portion of the handle 58 includes an integrally formed locking tab 62 having an "L" shape. The locking mechanism 56 further includes a biasing spring (not shown), such as an extension spring disposed in a recess (not shown) formed above the handle 58. Preferably, the spring is secured at one end to the handle 58 and at the other end to the side extension wall 22, to bias the handle in a locked position The cargo bed liner assembly 10 includes a tailgate panel 64 fixedly attached to the tailgate (not shown) of the vehicle using a conventional fastener, such as a screw. The tailgate panel 64 is a generally planar member, and includes a plurality of integrally formed ribs 66 spaced a predetermined distance apart, to provide structural support to the tailgate panel 64. The tailgate panel 64 also includes an integrally formed groove forming a track 68 for positioning the side extension wall 22 relative to the fixed wall. The groove has an "L" shape, with the smaller leg forming a locking groove as shown at 70, and similar to the locking groove 34 for receiving the locking tab 62 of the locking mechanism for retaining the side extension wall 22 in a fully extended position.

To operate the locking mechanism 56, the operator grips the handle 58 by placing the fingers in the recessed area 60 of the handle 58, and raises the handle 58 to overcome the force of the biasing spring to disengage the locking tab 62 from either the locking groove in the fixed side wall 20 or tailgate panel 64. It should be appreciated that the force of the biasing spring on the handle 58 retains the locking tab 62 in the preferred locking groove 34 or 70. Then, the operator slidably extends or retracts the side extension wall 22 to a predetermined position, aligns the locking tab 22 with the locking groove 34, 70 and releases the handle 58 so that the force of the spring retains the locking tab 62 in the locking groove 34, 70. In this example, the predetermined position is either at the end of the tailgate panel 64, or at the end of the fixed side wall 20. It should be appreciated that the side extension wall 22 effectively extends the length of the sides of the vehicle.

As shown in FIG. 3, the cargo bed liner assembly 10 includes a frame 72 for supporting the cargo bed liner assembly 10. The frame 72 includes an inner track 74 slidably disposed within an outer track 76 and supported by legs 78. Preferably, the legs 78 are mounted to the vehicle using a conventional fastening means, such as a bolt or screw. In this example, the inner track 74 has a "C" shape and the outer track 76 has a "U" shape. The inner track 74 and outer track 76 can be extruded from a material such as steel or plastic. The frame 72 extends along the length of the side wall 18. Preferably, the inner track 74 includes a gear track 75 disposed therein for indexing the travel of the divider panel 38 in the inner track 74. In this example, the gear track 75 includes a plurality of tooth-shaped members, as is known in the art, although other types of gear tracks 75 are contemplated. The side wall 18 is attached to the frame 72 using a conventional fastening mechanism, such as a bolt. In this example, the fixed side wall 20 is securely mounted to the outer track 76, and the side extension wall 22 is securely mounted to the inner track 74. Preferably, the height of the legs is selected so that the inner track 74 and outer track 76 are accessible through the slot 44, 52 extending therethrough the fixed side wall 20 and side extension wall 22.

Preferably, the frame 72 is disposed inboard of the wheel well (not shown) of the vehicle. This mechanical arrangement is not necessary; however, by so disposing the frame 72, it is assured that the divider panel 38 will clear the wheel well without the need to have any type of cutout or the like which could compromise its integrity.

The cargo bed liner assembly 10 includes a divider panel 38 that can be moved along the inner track 74 to a number of different positions, so as to permit the cargo bed to be subdivided into separate areas. As illustrated in FIG. 2, the panel 38 is shown in a first position A and a second position B, also within the cargo bed, as shown in phantom outline. In addition, the panel 38 can be moved atop the lowered tailgate, as shown in FIG. 1 at 80. Advantageously, when the divider panel 38 is in the position shown at 80 with the side extension wall 22 fully extended, the effective length of the cargo bed is increased. Further, the divider panel 38 can be removed from the cargo bed assembly 10 through the cut-away portion.

Referring to FIG. 4, the divider panel 38 includes a pair of generally rectangular panels 82 arranged parallel to each other, and a side panel 84 interconnecting the pair of panels 82. the divider panel 38 includes a positioning mechanism 30, to be described, disposed between the panels 82, 84, for fixedly retaining the divider panel 38 in the inner track 74. The panel 82 may include a cutout handle portion shown at 86 to aid in its repositioning.

In some embodiments of the present invention, the divider panel 38 may be configured so as to be pivotable in the inner track from a position wherein it is generally perpendicular to the floor 12 of the cargo bed assembly 10, to a position wherein it is parallel to the floor 12 so as to provide a table or work surface. In such instances, it may be advantageous to include within the panel 82 an integrally formed feature providing a cup holder, shown at 88. Similarly, panel 82 can be configured to include other features such as slots, as shown at 90, or small diameter openings (not shown) for holding work pieces or the like. Advantageously, manufacturers' logos and the like may also be incorporated into the divider panel 38 (not shown). Most preferably, the divider panel 38 is fabricated from molded polymeric material, although sheet metal, composites and the like may be similarly employed.

In FIG. 4, the divider panel 38 is illustrated in operational relationship to the frame 72 and vehicle. As shown, the divider panel 38 is supported within the inner track 74. The divider panel includes a support means 92 that provides support and movement of the divider panel 38 within the inner track 74. In this example, the support means 92 is a rod 94 extending longitudinally, with a wheel 96 attached to each end of the rod 94. The rod 94 is rotatably supported by the panel 82, such as by a hook 98. Preferably, the wheel 96 includes a gear 95, as is known in the art, for indexing the travel of the wheel 96 in the inner track 72. Advantageously, the indexed rolling motion of each wheel provides for uniform motion of each wheel, and avoids slipping and binding. It should be appreciated that the wheels 96 may include bearings and the like, as is understood in the art, to facilitate the rolling motion of the wheels 96 along the inner track 74.

As further illustrated in FIG. 4, the positioning mechanism 30 associated therewith for fixedly positioning the divider panel 38 is illustrated. Preferably the positioning mechanism 30 is disposed between the panels 82. The positioning mechanism 30 includes a handle 100 disposed within the handle cutout 86 for positioning the divider panel 38. The latching mechanism 30 also includes a stabilizing block 102 extending therethrough an opening in the side panel 84, and operatively connected to the handle 100. In operation, the stabilizing block 102 is rigidly engaged within the indexing groove 36, 50 in the side wall 18, to fixedly retain the divider panel 38 in a predetermined position. Preferably, there are two opposed stabilizing blocks 102.

In this example, the positioning mechanism 30 includes a center lever 104 that pivots about a fixed point, preferably in the center of the panel 82. The handle 100 is also a lever that pivots about an upper pivot point. It should be appreciated that in this example, there are two handles 100, with each positioned at an upper corner of the panel 82. Further, the center lever 104 and handles 100 are pivotally attached to the panel 82, such as by using a bolt 105. The positioning mechanism 30 further includes a means 106 for interconnecting the center lever 104 with the handles 100, such that in operation depressing the handle 100 actuates the center lever 104 to retract the block 102, so that the divider panel 38 can be repositioned. Preferably, the interconnecting means 106 interconnects a free end of one handle 100 with an end of the center lever 104, and an other end of the center lever 104 with the block 102. Similarly, another interconnecting means 106 connects the other handle 100 with the center lever 104. It is contemplated that the interconnecting means 106 is a rod or wire or the like. The positioning mechanism 30 also includes a biasing spring 108 fixed at one end to the block 102, and at an other end to the panel 92, so as to position and lock the block 102 within the indexing grooves 36, 50.

In operation, depressing one of the handles 100 causes the handle 100 to pivot upwards and the center lever 104 to pivot, which in this example is in the counterclockwise direction, thus retracting the block 102. In this example, depressing either handle 100 will cause both blocks 102 to simultaneously retract, so that the divider panel 38 can be repositioned. In addition, the divider panel 38 rolls along the track 74 at a uniform rate without slipping or binding, since the travel of the wheel 96 within the track 74 is indexed. Advantageously, the operator can reposition the divider panel 38 using one hand.

It is to be understood that the foregoing drawings, discussion and description illustrate particular embodiments of the present invention. Yet other modifications and variations thereof will be readily apparent to one of skill in the art. For example, as mentioned above, the divider panel 38 may be configured so as to be pivotable through at least 90° of rotation. This will provide for ease of access to the cargo compartment, and will permit the divider panel 38 to be used as a worktable, dining table, seating surface or the like. In such instances, folding legs or other such supports may be associated with the divider panel 38. The system of the present invention may be fabricated form a number of materials including metals, polymers, composites and the like. In some preferred embodiments, the frame 72 will be fabricated from high strength engineering polymers such as nylons, reinforced polymers and the like. In other instances, the frame 72 is most preferably fabricated from metal.

Referring to FIGS. 8 and 9, another embodiment of a multifunctional cargo bed liner assembly 210 with an integral track is illustrated. It should be appreciated that like features have like reference numerals increased by 200. In this embodiment, the fixed side wall includes an integral track 312 for positioning the divider panel 238, and the assembly 210 is self-supporting. The cargo bed liner assembly 210 includes a generally planar floor portion 212, forming the floor of the cargo bed liner assembly 210. The cargo bed liner assembly 210 also includes an end wall 214 extending from an end of the floor 212, adjacent the cab of the vehicle. Preferably, both the floor 212 and end wall 214 include a plurality of integrally formed ribs 216, as previously described. The ribs 216 are spaced a predetermined distance apart, and extend longitudinally. Advantageously, the ribs 216 provide structural support to the floor 212 and end wall 214, respectively.

The cargo bed liner assembly 210 further includes a side wall 218 extending upwardly from a side edge of the floor 212. In this example, the cargo bed liner assembly 210 includes a first side wall disposed in a transversely spaced relationship with a second side wall. Each side wall 218 includes a fixed side wall 220 and a side extension wall 222 slidably attached to the fixed side wall 220. It should be appreciated that the fixed side wall 220 is generally planar, and one side edge of the fixed side wall 220 is adjacent to the end wall 214.

The fixed side wall 220 or side extension wall 222 may include an integrally formed feature, such as a depression or boss or the like. For example, the fixed side wall 220 includes an integrally formed depression, shown at 226, that provides a storage compartment for the cargo bed liner assembly 210, in a manner to be described.

A lower portion of the fixed side wall 220 includes an integrally formed groove extending longitudinally, to provide a lower track 232 for slidably positioning the side extension wall 222, as previously described. Preferably, the overall length of the lower track 232 corresponds to the distance of travel required for the side extension wall 222. The lower track 232, as well as an upper mating engagement between the fixed side wall and the side extension wall, allow the side extension walls 222 to slide relative to the fixed side walls 220 without the requirement of additional frame/track structure as utilized in the embodiment of FIG. 3. The lower track 232 also includes a portion extending radially a predetermined distance from the lower track 232 to form a locking groove (not shown), for locking the side extension wall 222 in a desired position, as previously described.

The fixed side wall 220 includes a lower section 220a, an upper section 220c, and a midsection 220b formed therebetween the upper section 220c and the lower section 220a. The lower section 220a includes an indexing portion shown at 221, extending longitudinally there along the fixed side wall 220 a predetermined length, for indexing the position of a divider panel 238 for the cargo bed liner assembly 210, as previously described. The indexing portion 221 includes a plurality of integrally formed, vertically extending, indexing grooves 236 spaced a predetermined distance apart. The lower section 220a of the fixed side wall 20 also includes an integrally formed depression 226, which preferably conforms with the shape of the wheel well portion of the vehicle cargo bed.

The midsection 220b of the fixed side wall 220 includes an integrally formed channel 314 extending longitudinally between the upper section 220c and the lower section 220a of the fixed side wall 220. The channel 314 is oriented on a horizontal plane between the upper section 220c and the lower section 220a. Preferably, the channel 314 is U-shaped.

The upper section 220c of the fixed side wall 220 advantageously provides a storage area, as shown at 240 for storing items within the cargo bed liner assembly. The upper section 220c of the fixed side wall 220 includes a generally planar back wall 214, and a separable front wall 243. The back wall 214 extends upwardly from the midsection 220b of the fixed side wall 220. Preferably, the back wall 214 is molded to conform with vehicles having side walls of various shapes. The front wall 243 includes an access opening shown at 245 for providing access into or out of the storage area 240. Preferably, a door 247 covers the access opening 245, and articulates to provide ingress and egress to the storage area 240.

In addition, a lower edge of the front wall 243 forms a lip 249. The front wall 243 also includes a longitudinally extending flange 251 extending downwardly from an edge of the lip 249, and having an "L" shape. The lip 249 and flange 251 cooperating form a portion of the integral guide track 312 for guiding the movement of the divider panel. The vertical extending face of the flange 251 includes a longitudinally extending slot 244 for positioning the side extension wall 222 relative to the fixed wall 220 in a manner to be described. The front wall 243 and rear wall 241 are joined together to form an integral structure.

Advantageously, the side extension wall 222 increases the overall length of the cargo bed of the vehicle. It is contemplated that the side extension wall 222 may be formed as a single panel, or an assembly. In this example, the side extension wall 222 is an assembly and includes an inner panel 246 joined to an outer panel, 248 to form a unitary wall, having a box-like shape, as previously described.

The outer panel 248 is a generally planar member, and includes a forward section 253 and a rearward section 255. The forward section 253 is a partial wall, and does not extend all the way to the floor 212 of the cargo bed liner assembly 210. The rearward section 255 is a full wall and extends all the way to the floor 212 of the cargo bed liner assembly 210. The rearward section 255 includes a lower flange 248a extending from a lower edge that forms a lower guide for the side extension wall 222 in the lower track 232 in the fixed side wall 220.

The side extension wall 222 also includes an upper flange 248b extending from an upper edge, that forms an upper guide for the side extension wall 222 with respect to the fixed side wall 220. In this embodiment, the upper flange 248b has an inverted "L" shape. The upper flange 248b includes at least one outwardly projecting guide means 257 disposed therein. An example of a guide means 257 is a fastener, such as a bolt or screw or the like, although other types of guides are contemplated. The guide means 257 includes a head portion that is movably engaged within the guide slot 244 in the securing flange 251. In operation, the guide means 257 travels within the guide slot 244 to locate and position the side extension wall 222 relative to the fixed wall 220.

The outer panel 248 further includes a plurality of vertically extending indexing grooves 250 spaced a predetermined distance apart, similar to the grooves 236 in the fixed side wall 220, for positioning the divider panel 238. It should be appreciated that an upper end of the indexing grooves forms a gear track 275 for indexing the position of the divider panel, while the vertically extending depression between consecutive indexing grooves 250 lock in the indexed position of the divider panel 238.

Preferably, the outer panel 248 includes a cutaway portion (not shown) for removing the divider panel 238 from the cargo bed liner assembly 210 in a similar manner as previously described.

The inner panel 246 is also a generally planar member, and provides a rear wall and structural support to the side extension wall 220. Advantageously, the inner panel 246 and outer panel 248 can be formed and joined as one using a conventional technique, such as blow molding. The side extension panel further includes a locking mechanism 256, as previously described.

It should be appreciated that when assembled together, the flange 251 of the front wall 243 and upper flange 248b of the outer panel 248 of the side extension wall 222 and gear track 275 form an integral track 312 for indexing the position of the divider panel 238.

The cargo bed liner assembly 210 further includes a divider panel 238 and a positioning mechanism 230 for the divider panel 238, as previously described. The cargo bed liner assembly 210 also includes a tailgate panel fixedly attached to the tailgate (not shown) of the vehicle, as previously described.

The cargo bed liner assembly 210 with integral track 312 operates in a similar manner as previously described for the cargo bed liner assembly of FIG. 1. The guide means 257 for the side extension wall 222 extends therethrough the guide slot 244 in the flange 251 in the front wall 243 of the fixed side wall 218. The locking mechanism 256 is operated to position the side extension wall 222 relative to the fixed side wall 220. The divider panel 238 is positioned by depressing the handle 300 to retract the stabilizing block 302, moving the divider panel 238 along the track 312 to the desired position. Advantageously, the travel of the divider panel 238 within the integral track 312 is indexed, to avoid slipping or binding of the divider panel 238 as it is positioned. The handle 300 is released, such that the block 302 is fittingly retained within the indexing grooves 236 or 250.

Advantageously, the cargo bed liner assembly 210 is self-supporting, and is removably attached to the vehicle using an attaching means 310. An example of an attaching means 310 is a fastener such as a bolt, screw or hook or the like. Advantageously, this embodiment of the cargo bed liner assembly 210 does not utilize frame for support, and includes an integral track 312.

Figure 21:
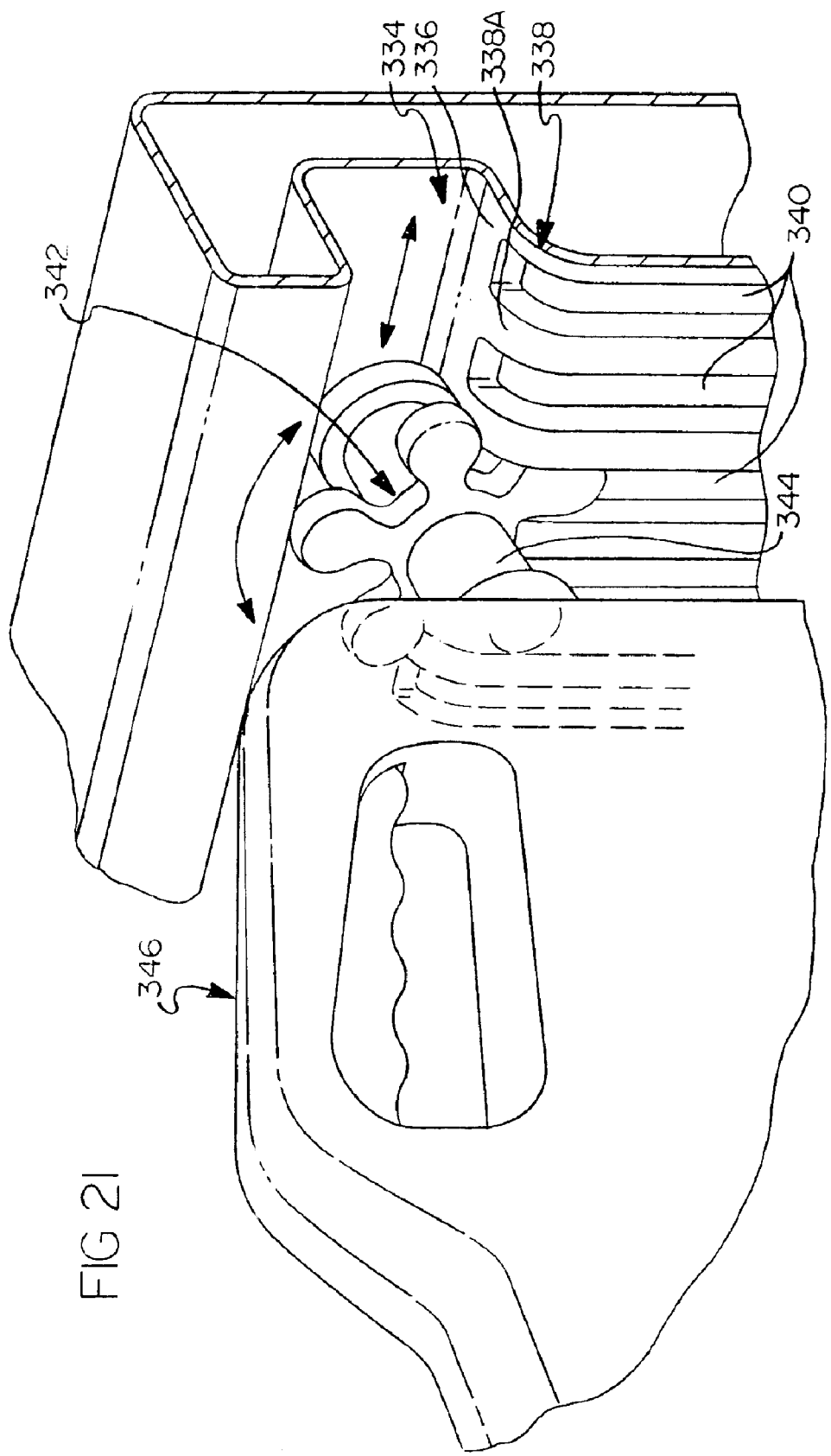
FIG. 21 is a detailed perspective view illustrating the engagement between the integrally formed gear track of the side walls and the gear wheels supporting the divider panel.

With reference to FIG. 10, a vehicle 320 such as a pick-up truck is provided with a cargo area 322 including a first side wall 324 and a second side wall 326 disposed in a generally transverse relationship. A floor 328 extends between the sidewalls 324, 326. The side walls 324, 326 each include a fixed side wall portion 330 and a side extension wall portion 332 which is slidably movable relative to the fixed side wall portion 330. The side walls 324, 326 each include an integrally formed guide track 334 as best illustrated in FIG. 21. With continued reference to FIG. 21, the guide track includes a roller track portion 336 and a geared track portion 338 with gear teeth portions 338A which are in alignment with indexing grooves 340 which are provided along the vertical side walls. The gear teeth portions of the gear track 338 being in alignment with the vertical indexing grooves 340 allows debris that come in contact with the gear track 338 to fall downward through the indexing grooves 340 so that they do not inhibit movement of the gear wheels 342 of the support rod 344 supporting the movable divider panel 346.

Lights 350, including stop lights 352, turning signal lights 354, and tail lights 355 are mounted at the rear end of the side extension wall portions 332. The lights 350 are rendered operable when the side extension wall portions 332 are extended over top of the vehicle tailgate 356 and inoperable when the side extension wall portions 332 are pushed inward to a retracted position with the vehicle cargo area 322. A switch device 360, as best shown in FIG. 10A, is provided for activating and deactivating the tail lights 350 much like the dome lights of a vehicle are activated and deactivated by opening and closing a vehicle door. In order words, the switch device 360 has a plunger 362 movable relative to a base housing 363 which, when depressed, deactivates the secondary lights 350 and when released (as by extending the side extension wall portions), activates the secondary lights 350.

The vehicle 320 is also provided with exterior rear body panels 364 which are provided with primary stop/turn/tail lights 366 mounted at a rear end thereof. The primary lights 366 can be optionally deactivated upon activation of the secondary lights 350 when the side extension wall portions 332 are extended out over the tail gate 356. The switch device 360 is preferably positioned so that upon retracting the extendable side wall portion 332, the plunger 362 comes in contact with a stop member (not shown) to cause the plunger 352 to be depressed for deactivating the auxiliary lights 350.

With reference to FIG. 11, a vehicle cargo area 322 such as that described with reference to FIG. 10, can be provided with two or more movable divider panels 346 for providing increased versatility in dividing the cargo area 322. In addition, the movable divider panels 346 can be articulated to a horizontal position, as illustrated in phantom, such that the stabilizing block 102 can rest on the ledge formed by the guide track 334 to maintain the movable divider panel 346 in a horizontal position. The cargo area 322 can then be utilized in a two-tier loading configuration wherein articles can be stowed underneath the divider panels and on top of the divider panels 346.

With reference to FIG. 12, a sport utility-type vehicle 370 is shown. Although the cargo system of the present embodiment is shown utilized in combination with a sport utility-type vehicle, it should be understood that the cargo system herein described can also be utilized with vans and mini-vans and other rear hatchback-type vehicles such as stations wagons. In the embodiment shown, the sport utility vehicle includes a unitary interior compartment 372 including a driver and passenger area 374 and a cargo area 376. The driver and passenger area 374 can include both front driver and passenger seats 374A as well as a second and/or third row of passenger seats 374B. The cargo area 376 generally extends from the rear gate 378 of the vehicle forward to the rear of the vehicle driver/passenger compartment 374. The side walls 380 of the cargo area are provided with guide tracks 382 extending along the first and second side walls as well as indexing grooves 384 provided below the guide tracks 382. One or more movable divider panels 386 are movably supported along the guide tracks 382 in order to provide multi-functional uses within the cargo area 376 of the vehicle 370. In particular, the movable divider panels 386 can be used as divider panels for separating the cargo area 376 into different sized compartments as has been described in detail above with respect to other embodiments. In addition, the movable divider panels 386 can be used in a horizontal position to serve as a sun shade and security panel for storing items out of view and out of the sunlight that may come into the side windows 390 or the rear window 392 provided in the rear gate 378. In addition, the movable divider panel 386 can be pivoted to an upside down vertical position (as illustrated) just behind the rearmost passenger seats in order to provide an additional barrier for pets or for providing a protective barrier from articles stored in the cargo area 376 from flying forward in case of an accident. A pair of indexing grooves 400 are provided in the vehicle side walls above the guide tracks 382 for receipt of the stabilizing blocks of the movable divider panel 386 to secure the movable divider panel 386 in the upside down vertical position.

Figure 25:
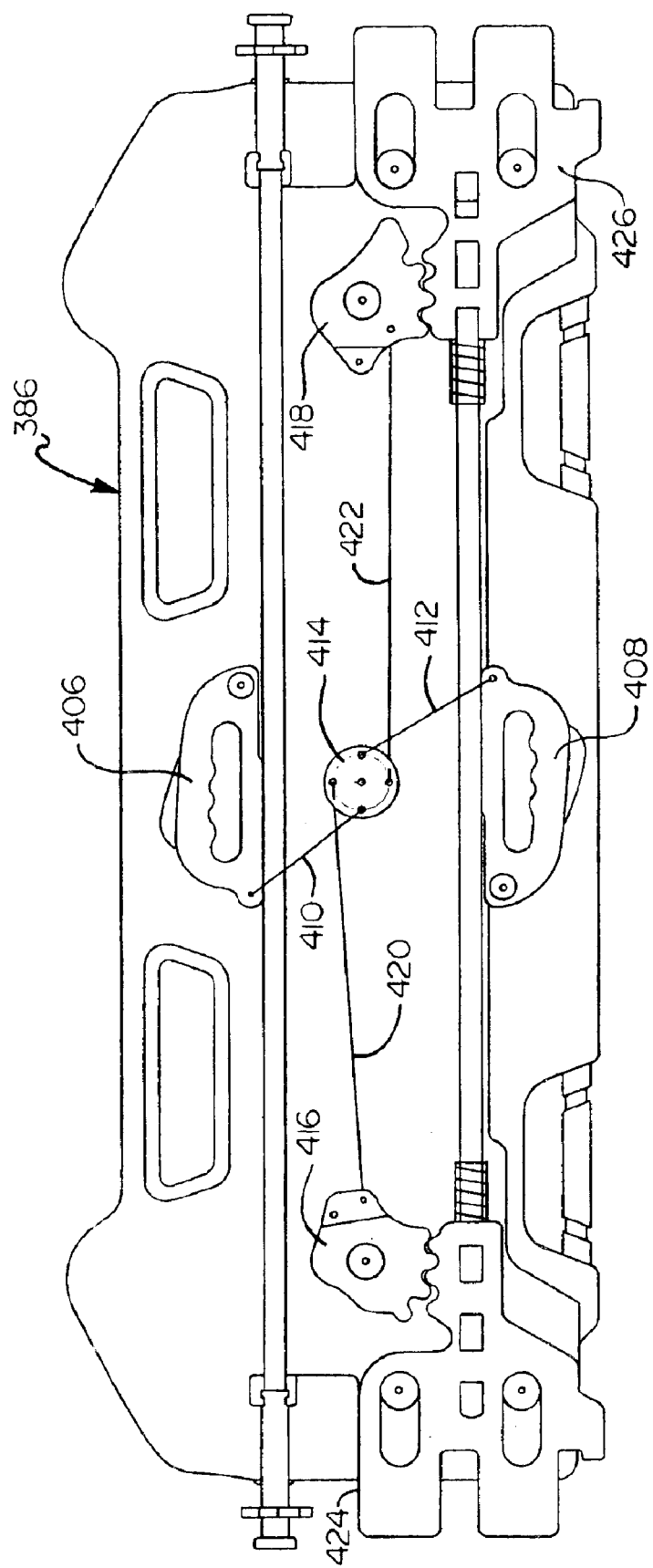
FIG. 25 is a plan view of a movable divider panel having upper and lower operating handles for disengaging the stabilizing block for use in mini-van and SUV-type vehicle applications.

With reference to FIG. 25, the movable divider panel 386 for utilization in an SUV, van, or other hatchback-type vehicle can be provided with upper and lower operating handles 406, 408 which are each provided with an operating linkage 410, 412, respectively, each connected to a rotary actuator 414. The rotary actuator is connected to a pair of pinions 416, 418 by connecting rods 420, 422. Activation of either of the handles 406, 408 causes rotation of the actuator 414 to rotate the pinions 416, 418. The pinions 416, 418 drive the stabilizing blocks 424, 426 in an inward direction in order to disengage the stabilizing blocks 424, 426 from the indexing grooves 384 provided on the side walls of the vehicle 370. Once the stabilizing blocks 424, 426 are disengaged from the indexing grooves 384, the movable divider panels 386 are free to move in a forward or aft direction and are also capable of articulating from a vertical position to a horizontal position or to an upside down vertical position as described above.

The movable divider panel 386 can be maintained in the horizontal position by disengaging the handles 406, 408 to allow the stabilizing members 424, 426 to rest upon the ledge formed by the guide track 382. Likewise, in the vertical upside down position, the stabilizing blocks 424, 426 can be released into the indexing grooves 400 provided above the guide track 382 in a position just rearward of the rearward most passenger seats.

With reference to FIGS. 13A, 13B, and 14, the components of a movable divider panel 346, according to the principles of the present invention, will now be described. The divider panel 346 includes a first main body panel 442 including a first face 444 and a second face 446 interconnected by a peripheral outer edge 448, as best shown in FIG. 14. The second face 446 includes a recessed portion 450. The recessed portion 450 includes in-molded recesses which serve as journals 452 for supporting a support rod 344 therein. The support rod 344 includes a geared roller 342, as described previously, at each end thereof.

The recessed portion 450 includes integrally formed pivots 458 which are received in holes 460 provided in the handles 462 so that the handles 462 pivot about the pivots 458. Connecting rods 464 are connected between the handles 462 and a pair of pinion members 466. The pinion members 466 each include a plurality of teeth 468 which engage with teeth 470 which are integrally formed with stabilizing members 472. Stabilizing members 472 are each provided with elongated slots 474 which each receive a guide pin 476 integrally formed with a main body panel 442. Stabilizing members 472 include a U-shaped channel 480 provided therein in engagement with a stop finger 482 which limits the lateral movement of the stabilizing members 472. Each stabilizing member 472 has a cylindrical channel portion 484 which receives a guide rod 486 therein. A coil spring 490 is supported by the guide rod 486 and seats between a further recessed shoulder portion 492 formed on the main body panel 442 and the stabilizing members 472 for biasing the stabilizing members 472 in a laterally outward direction.

The stabilizing members 472 include a lower finger portion 494 which engage an indexing groove on the floor of the cargo area. The locking finger 494 is capable of extending underneath a horizontal rib to prevent the stabilizing members 472 and movable divider panels 346 from moving upward in case a vehicle hits a bump.

A connecting rod 496 is connected between the pinion members 466 so that rotation imparted on one pinion member 466 by either handle 462 is also imparted upon the other pinion member 466. Thus, activation of either handle 462 will cause both stabilizing members 472 to be retracted in an inward direction against the biasing force of the coil springs 490. The connecting rod 496 connected between the pinions 466 is received in a recessed elongated channel 498 provided on the second face 450 of the main body panel 442. The recessed channel 498 is provided with a reduced diameter intermediate portion 500 for restricting bending of the connecting rod 496 when the connecting rod 496 is under compression.

As best illustrated in FIG. 14, the first body panel 442 is preferably formed from blow molded plastic and has a hollow inner core 502 for reduced weight while still exhibiting significant rigidity due to its three-dimensional configuration. Referring now to FIG. 13A, the main body panel 442 is provided with three upper openings 504 provided therein. The upper openings 504 are sized so as to allow elongated cargo such as pipes and lumber to be inserted through the holes 504 to keep the articles from rolling around within the cargo space. The holes 504 are preferably sized to receive 1½ inch by 3½ inch items therein. A pair of lower handles 506 are provided to facilitate ease of movement of the divider panel in a forward or aft direction. The handles 506 are provided with recessed areas 508 in which bungee cords, or other tie-down straps can be attached for use in combination with the movable divider panel 440.

With reference to FIG. 13B, a secondary cover panel 510 having a complimentary shape to the recessed portion 450 of the first body panel 442 is provided as a face plate for covering the recessed portion 450 of the main body panel 442. The second body panel 510 is provided with a plurality of mounting holes 512 which are adapted to receive screws (not shown) or other fasteners for securing the second body panel 510 to the main body panel 442. Corresponding mounting bosses 516 are provided in the main body panel 442 for receipt of the screws 514. The mounting bosses 516 also correspond with the integrally formed pivots 458 and integrally formed guide lugs 476.

The mounting holes 512 also can be utilized for mounting various accessories to the movable divider panel as will be described in greater detail herein. The second body panel 510 can also be formed of a blow molded plastic thus having a hollow inner core (not illustrated) such that the second body panel 510 is provided with significant rigidity due to its three dimensional configuration. As best illustrated in FIG. 14, a cross section of the movable divider panel is illustrated with the second body panel 510 mounted to the recessed portion 450 provided in the second face 446 of the main body panel 442.

It should be understood that although a guide rod 486 is shown extending across the entire length of the movable divider panel, other guide arrangements can be provided integrally formed within the body panels 442, 510.

With reference to FIGS. 15–19, various accessories are illustrated in combination with the movable divider panels for increasing the functionality of the movable divider panel within the multi-functional vehicle cargo area according to the principles of the present invention. Specifically, with reference to FIG. 15, a movable divider panel 346, such as described with reference to FIGS. 13 and 14, is provided with a tool box 530 mounted thereto. The toolbox 530 is provided with mounting holes for receiving screws which are engaged with the mounting holes 512 and bosses 516 provided on the second body panel 510 and first main body panel 442, respectively. The toolbox 530 can also be provided with a second support rod 344 provided with geared rollers 342 at opposite ends thereof for providing additional support to the toolbox 530. The support rod 344 of the movable divider panel 440, as well as the support rod 344 which is in direct supporting relationship with the toolbox 530 are both received in a guide track in a vehicle cargo area as described above. The toolbox 530 can also be provided with a hinged cover 532 for allowing access to the interior of the toolbox 530. A latch 534 can be provided for maintaining the cover 532 in a closed position. Additional interior trays and other features, as are widely known in the toolbox art, can also be utilized with the toolbox 530. The toolbox 530 can also be provided with support wheels 536 to help support the toolbox 530 on the floor of the vehicle cargo area.

With reference to FIG. 16, the movable divider panel 346 can also be provided with a bike rack 540 mounted thereto via the mounting holes 512 and mounting bosses 516 provided on the second body panel 510 and main body panel 442, respectively. The bike rack 540 can be adapted to receive the front forks 542, bike frame 544, or tire 546 of a bicycle 548.

With reference to FIG. 17, a cargo net 550 is shown mounted to the movable divider panel 346 utilizing the mounting holes 512 and mounting bosses 516 provided in the second body panel 510 and main body panel 442, respectively. The cargo net 550 can be utilized to prevent objects from rolling around in a vehicle cargo area.

With reference to FIG. 18, a movable divider panel 346, as described herein, is provided with a pair of pivoting separator panels 560 pivotally attached to the movable divider panel 346 by a hinge joint 562. The pivotable separator panels 560 can be pivoted to a perpendicular position relative to the face of the movable divider panel 346 in order to provide additional functionality to the movable divider panel 346 by allowing additional separation of lateral compartments of the vehicle cargo area. With reference to FIG. 18A, hinge joint 562 can include a self-locking feature that can be overcome by lifting upward (Arrow X) on the separator panel 560 while providing several distinct angular locking positions A–E in the base plate 566 in which the locking tab 564 of the separator panel 560 can be lowered down into for providing self-locking in each distinct angular position.

With reference to FIG. 19, the movable divider panel 346 is provided with a foldable box 570 mounted thereto to provide additional functionality to the movable divider panel 346. The foldable box 570 can be of any form known in the art, and can be mounted to the movable divider panel via the mounting holes 512 and mounting bosses 516 provided in the second body panel 510 and main body panel 442, respectively.

Figure 20B:
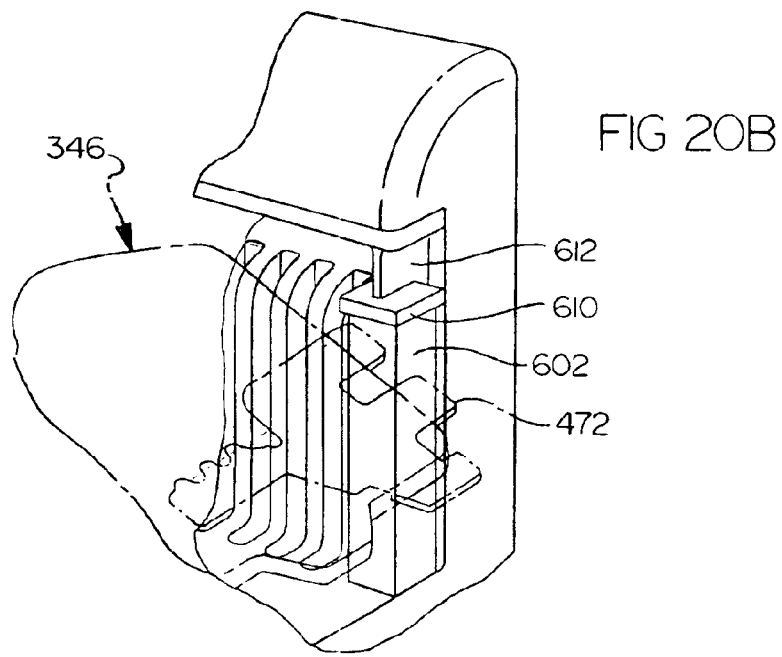
FIG. 20B is a perspective view similar to FIG. 20A showing the divider panel pivoting to a horizontal position and engaging the locking mechanisms for disengaging the locking mechanism of the movable side walls according to the principles of the present invention.
Figure 20C:
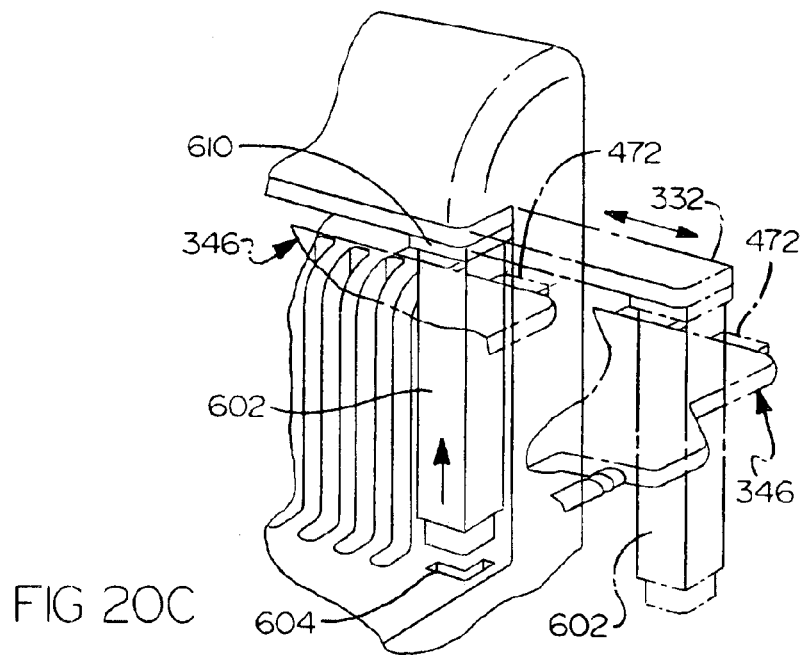
FIG. 20C is a perspective view of the movable divider panel pivoted to a horizontal position and thus moving the locking mechanism to a fully disengaged position for allowing the side walls to be extended out over a tailgate of the vehicle.

With reference to FIGS. 20A–20C, a locking mechanism 600 is shown at an end portion of a side extension wall 332 for locking a position of the side extension wall 332 relative to the fixed side wall portion 330. The locking mechanisms 600 are provided on each of the side extension walls 332 and include a locking plate 602 slidably movable between a downward locked position and an upward unlocked position. The locking plate 602 is received in a recess 604 provided in the floor of the cargo area. A similar recess 604 is also provided at the end of the tailgate so that the locking mechanism 600 can engage the recess 604 at either the end of the cargo area or at the end of the tailgate. A spring 606 is provided between the vertically sliding locking plate 602 and a stationary flange 608 for biasing the locking plate 602 in a locking position.

The locking plate 602 includes an upper flange or a finger 610 fixedly mounted to the locking plate 602. The locking plate 602 is slidably mounted to a vertical column 612 provided at an end of the side extension wall portions 332. In a normal lock position, as shown in FIG. 20A, the locking plate 602 is biased in a downward direction by spring 606 and is received in recess 604 provided in the floor of the cargo area. A movable divider panel 346 is supported in a guide track 334 as is described above. Upon depression of the operating handle 462, the stabilizing members 472 are retracted inward to allow the movable divider panel 346 to pivot, as illustrated in FIG. 20B, about the support rod such that as the movable divider panel 346 pivots, the stabilizing members 472 engage the flange portion 610 of the locking plate 602. Continued articulation of the movable divider panel 346 causes the stabilizing members 472 to lift upward on the flange 610 of the locking plate 602 so as to cause the locking plate 602 to move upward, as illustrated in FIG. 20C, so that the locking plate 602 is withdrawn from the recess 604 provided in the floor of the cargo area. Thus, by articulating the movable divider panel 346 to a horizontal position, an operator can simultaneously disengage the locking mechanism 600 on each of the side extension wall portions 332. The user then can pull rearwardly on the movable divider panel 346 and pull each of the side extension walls 332 out over the tailgate. Upon returning the movable divider panel 346 to the horizontal position, the locking mechanism 600 is then automatically returned to the locking position to engage recesses 604 provided at the ends of the tailgate (see FIG. 11).

Figure 22:
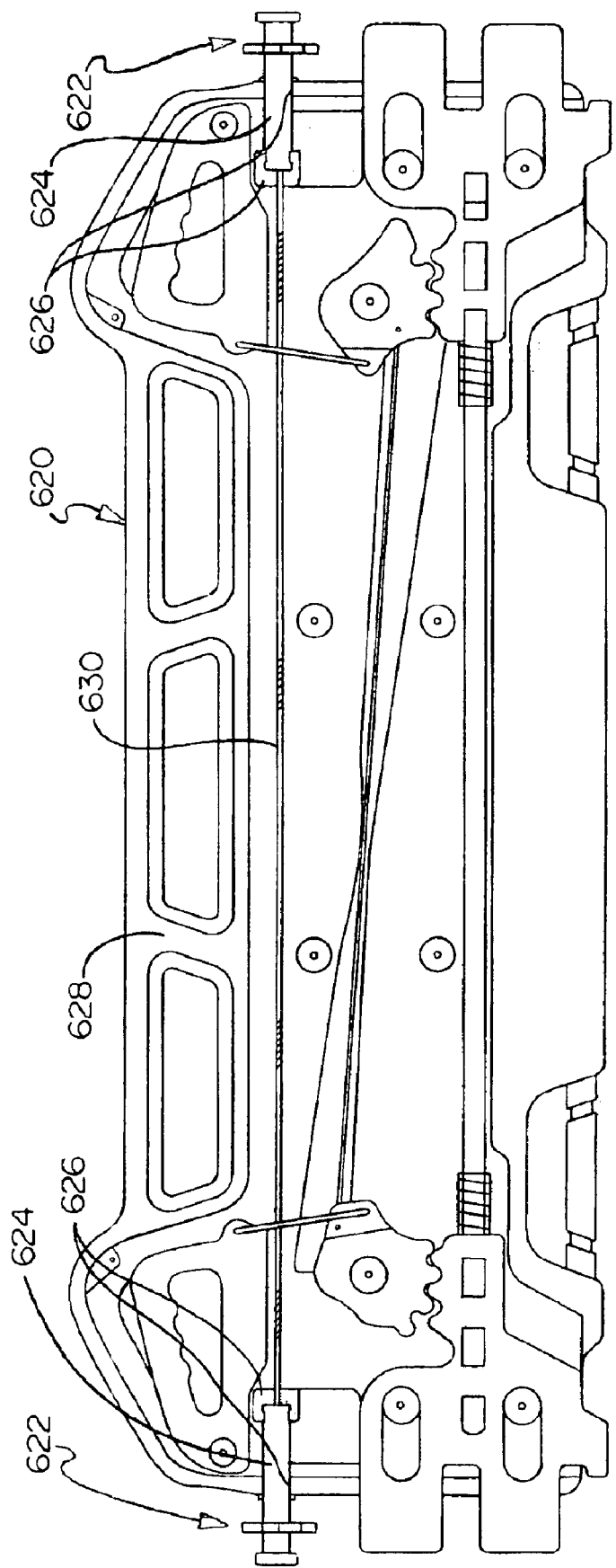
FIG. 22 is a schematic view of a divider panel having co-rotating support shaft segments connected to one another by a drive cable for indexing the rotation of the gear members along the geared tracks.

With reference to FIG. 22, a movable divider 620 is provided with a support mechanism including a pair of co-rotating gear wheels 622 each supported on a shaft segment 624. The shaft segments 624 are each supported by integrally formed journal portions 626 formed in the body 628 of the movable divider panel 620. Each of the shaft segments 624 are connected to a drive cable 630. The drive cable 630 allows for a lighter weight support system while ensuring that the gear wheels 622 co-rotate with one another so that wedging of the movable divider panel 620 does not occur.

Figure 23:
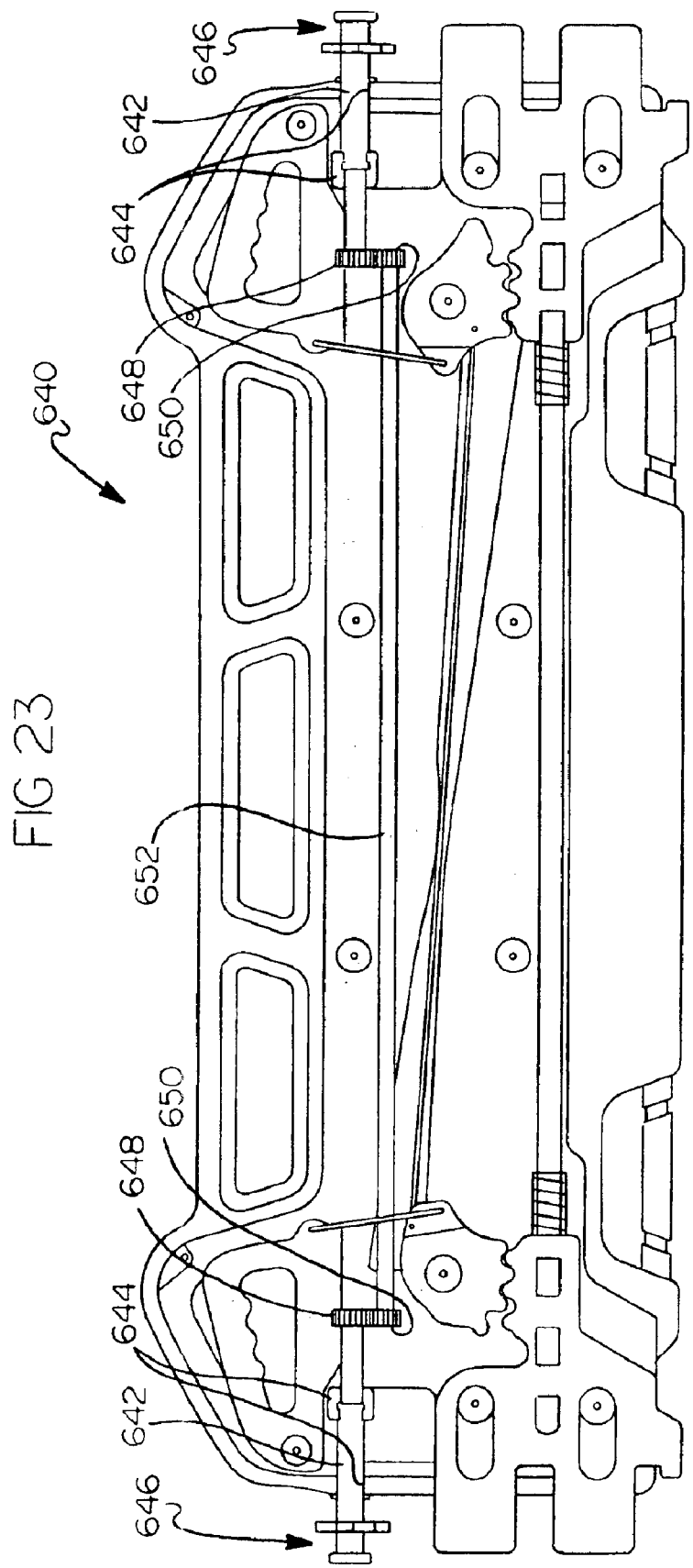
FIG. 23 is a plan view of a divider panel having co-rotating geared shaft segments connected to one another by an offset geared shaft.

With reference to FIG. 23, a movable divider panel 640 is shown including a support mechanism including a pair of shaft segments 642 rotatably supported within an integrally formed journal 644 of the movable divider panel 640. Each shaft segment 642 is provided with a gear wheel 646 at an outer end thereof and a gear 648 at an inner end thereof. Each of the gears 648 are engaged with corresponding gears 650 provided on the end of an offset driveshaft 652. The use of the offset geared shaft 652 provides versatility in the construction of the movable divider panels 640 while ensuring that each of the gear wheels 646 co-rotate with one another in order to ensure that the movable divider panel 640 does not wedge between the gear tracks.

Figure 24:
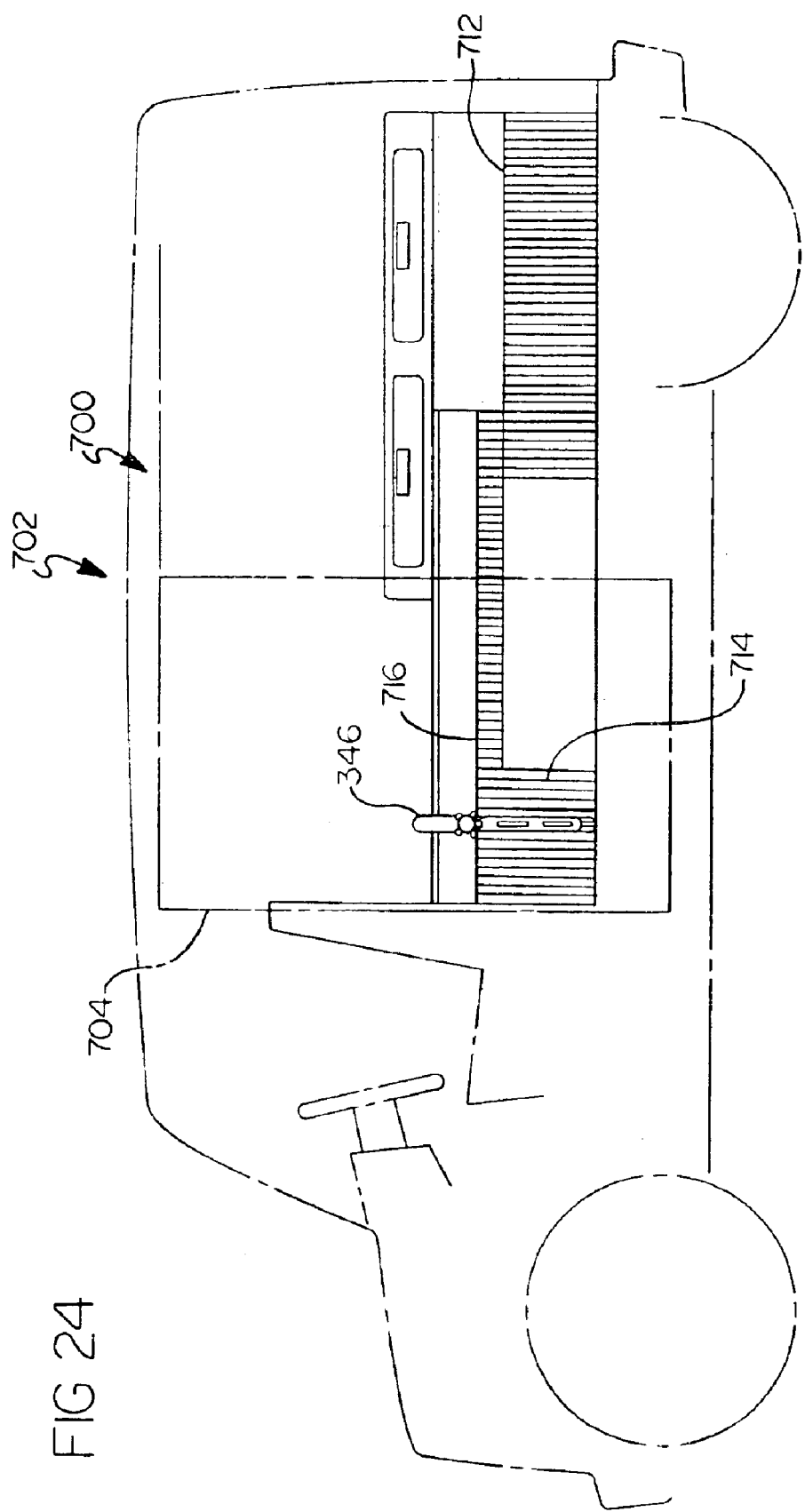
FIG. 24 is a perspective view of a van-type vehicle having movable side extension walls that move forwardly over the van door opening so that a movable divider panel can be utilized in a forward portion of the van cargo area, in the area of the van rear side doors.

With reference to FIG. 24, a multi-functional cargo area 700 is shown for a van-type vehicle 702 including at least one side door 704. Cargo area 700 includes a first side wall and a second side wall each including a fixed side wall portion 712 and a side extension wall 714 slidably attached to the fixed side wall 712. The side extension walls 714 are slidably movable in a forward direction (as illustrated) relative to a longitudinal direction of the van in an overlapping relationship relative to the opening of the at least one side door 704. Each of the side walls define a guide track 716 on a length thereof. A movable divider panel 346 is supported transversely between the guide tracks 716 for movement there along. The present invention provides greater versatility for the cargo area of a van-type vehicle with a side door in the cargo area by allowing the side extension walls 712 to extend forward over the side door opening.

Many modifications and variations of the present invention are possible in light of the above teachings. Therefore, within the scope of the appended claims, the present invention may be practiced other than as specifically described.

What is claimed is:

1. A divider panel for use along a pair of oppositely disposed guide tracks of a pair of oppositely disposed sidewalls of a vehicle cargo area, comprising:

a first body panel including a first face and a second face interconnected by a peripheral outer edge, said second face including a recessed portion therein;

at least one stabilizing member disposed in said recessed portion of said first body panel and extending from a side peripheral outer edge of said first body panel;

an actuator mechanism including an actuator handle and a linkage assembly operably attached to said at least one stabilizing member;

a support mechanism including a pair of members extending from opposite sides of said first body panel; and a second body panel adapted to be received in said recessed portion of said first body panel in covering relationship over at least a portion of said at least one stabilizing mechanism, said linkage assembly and said support mechanism.

2. The divider panel of claim 1, wherein said first and second body panels are formed from blow molded plastic.

3. The divider panel of claim 1, wherein said first body panel includes in-molded recesses supporting said support mechanism disposed within said recessed portion.

4. The divider panel of claim 1, wherein said at least one stabilizing member includes a pair of stabilizing members extending from opposite side peripheral outer edges of said first body panel and wherein said linkage assembly includes a pair of drive members associated with each of said pair of stabilizing members and a connecting rod extending between said pair of drive members, said connecting rod being received in an elongated channel disposed in said recessed portion of said first body panel.

5. The divider panel of claim 4, wherein said elongated channel includes a reduced diameter intermediate portion for restricting bending of said connecting rod.

6. A divider panel for use along a pair of oppositely disposed guide tracks of a pair of oppositely disposed sidewalls of a vehicle cargo area, comprising:

an elongated body panel;

a pair of stabilizing members supported by said elongated body panel and extending from opposite side edges of said elongated body panel, said pair of stabilizing members each including a rack portion;

a pair of drive pinions operably engaging said rack portion of said pair of stabilizing members;

an actuator member operable by a user and operably connected to at least one of said pair of drive pinions.

7. The divider panel of claim 6, further comprising a connecting rod connected to each of said pair of drive pinions.

8. A divider panel for use along a pair of oppositely disposed guide tracks of a pair of oppositely disposed sidewalls of a vehicle cargo area, comprising:

an elongated body panel;

a pair of stabilizing members supported by said elongated body panel and extending from opposite side edges of said elongated body panel; and a guide rod extending between said pair of stabilizing members, said guide rod supporting a pair of springs interacting between said guide rod and said stabilizing members for biasing said stabilizing members in a laterally outward direction.

9. A cargo area of a vehicle, comprising:

a first sidewall and a second sidewall disposed in a generally transverse relationship, said first sidewall and said second sidewall each including a geared guide track;

a movable divider panel supported transversely between said geared guide tracks of said first and second sidewalls;

said first and second sidewalls each defining a plurality of vertical indexing grooves spaced a predetermined distance apart for indexing a position of the divider panel, said vertical indexing grooves being aligned with and connected to trough sections of said geared guide track.

10. The cargo area of claim 9, wherein said first and second sidewalls each define an integrally formed roller track disposed adjacent to said geared guide track.

11. A vehicle cargo area, comprising:

a first sidewall and a second sidewall disposed in a transversely spaced relationship, and a floor extending between said first and second sidewalls, a pair of tracks extending along said sidewalls, wherein said pair of tracks each include a gear track disposed thereon; and a divider panel movably supported between said pair of tracks, said divider panel including a pair of co-rotating gear members disposed on opposite ends thereof for matingly engaging said gear tracks.

12. The cargo area of claim 11, wherein said pair of co-rotating gear members are rotatably connected to one another by a drive cable.

13. The cargo area of claim 11, wherein said pair of co-rotating gear members are rotatably connected to one another by an offset geared shaft.

* * * * *